United States Patent
Ito et al.

(10) Patent No.: US 11,492,001 B2
(45) Date of Patent: Nov. 8, 2022

(54) NOTIFICATION DEVICE

(71) Applicant: Toyota Jidosha Kabushiki Kaisha, Toyota (JP)

(72) Inventors: Hayato Ito, Susono (JP); Toshiki Kindo, Yokohama (JP); Takayuki Iwamoto, Sunto-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 264 days.

(21) Appl. No.: 16/708,863

(22) Filed: Dec. 10, 2019

(65) Prior Publication Data

US 2020/0189614 A1  Jun. 18, 2020

(30) Foreign Application Priority Data

Dec. 17, 2018 (JP) .............................. JP2018-235499

(51) Int. Cl.
| | |
|---|---|
| *B60W 50/14* | (2020.01) |
| *H04S 7/00* | (2006.01) |
| *B60W 30/095* | (2012.01) |
| *G06V 20/58* | (2022.01) |
| *G06V 20/59* | (2022.01) |

(52) U.S. Cl.
CPC ........ *B60W 50/14* (2013.01); *B60W 30/0956* (2013.01); *G06V 20/58* (2022.01); *G06V 20/597* (2022.01); *H04S 7/303* (2013.01); *B60W 2050/143* (2013.01)

(58) Field of Classification Search
CPC ....... B60W 2050/143; B60W 30/0956; B60W 50/14; B60W 2050/146; B60W 30/095; B60W 30/08; B60W 50/16; G06K 9/00805; G06K 9/00845; H04R 2430/01; H04R 2499/13; H04S 7/303; G06V 20/58
See application file for complete search history.

(56) References Cited

U.S. PATENT DOCUMENTS

| | | | |
|---|---|---|---|
| 9,672,446 B1 * | 6/2017 | Vallespi-Gonzalez | G06K 9/00805 |
| 10,049,686 B1 * | 8/2018 | Hera | G10L 21/0208 |
| 10,065,638 B1 * | 9/2018 | Wood | B60W 30/09 |
| 10,205,428 B1 * | 2/2019 | Paepcke | B60Q 5/008 |
| 10,613,219 B1 * | 4/2020 | DeCia | G01S 13/931 |
| 11,067,996 B2 * | 7/2021 | Oder | G06K 9/00979 |
| 11,210,540 B2 * | 12/2021 | Yamamoto | H04N 7/188 |

(Continued)

FOREIGN PATENT DOCUMENTS

| | | |
|---|---|---|
| JP | 2006-190193 A | 7/2006 |
| JP | 2007-328603 A | 12/2007 |

(Continued)

*Primary Examiner* — Babar Sarwar
(74) *Attorney, Agent, or Firm* — Dinsmore & Shohl LLP

(57) ABSTRACT

A notification device includes an object detection unit configured to detect a position and a relative condition of an object around a host vehicle; a virtual sound source setting unit configured to set a virtual sound source around the driver, based on the detected position of the object; a sound output unit configured to output a notification sound to a driver; and a sound output control unit configured to output the notification sound from the sound output unit such that the driver identifies that the notification sound in response to the relative condition has come from a direction of the set virtual sound source, based on the set virtual sound source and the relative condition.

5 Claims, 28 Drawing Sheets

(56) References Cited

U.S. PATENT DOCUMENTS

| | | | |
|---|---|---|---|
| 2005/0111698 A1* | 5/2005 | Kawai | B60R 1/00 382/103 |
| 2005/0276450 A1* | 12/2005 | Taniguchi | G06K 9/00805 382/104 |
| 2010/0253539 A1* | 10/2010 | Seder | G01C 21/365 340/902 |
| 2013/0194107 A1* | 8/2013 | Nagata | G08G 1/161 340/904 |
| 2013/0251168 A1* | 9/2013 | Takazawa | H04S 7/30 381/66 |
| 2014/0085470 A1* | 3/2014 | Sako | B60Q 1/0023 348/148 |
| 2015/0117652 A1* | 4/2015 | Sato | G10L 21/0216 381/56 |
| 2015/0137998 A1* | 5/2015 | Marti | G10K 11/1754 340/901 |
| 2015/0365743 A1* | 12/2015 | Konigsberg | H04R 3/00 381/86 |
| 2016/0345115 A1* | 11/2016 | Paik | H04S 7/30 |
| 2018/0034951 A1* | 2/2018 | Boesen | H04M 1/6066 |
| 2018/0059240 A1* | 3/2018 | Kawanishi | B60W 30/095 |
| 2018/0118107 A1* | 5/2018 | You | G08G 1/005 |
| 2018/0322413 A1* | 11/2018 | Yocam | G07C 5/085 |
| 2019/0061618 A1* | 2/2019 | Zhang | G08G 1/096791 |
| 2019/0241198 A1* | 8/2019 | Mori | B60W 50/14 |
| 2020/0019793 A1* | 1/2020 | Igal Raichelgauz | G06K 9/66 |
| 2020/0086863 A1* | 3/2020 | Rosman | G06N 3/088 |
| 2020/0090518 A1* | 3/2020 | Sano | G08G 1/16 |
| 2020/0167045 A1* | 5/2020 | Takahashi | B60W 50/14 |
| 2020/0247422 A1* | 8/2020 | Yoshida | A61M 21/00 |

FOREIGN PATENT DOCUMENTS

| | | |
|---|---|---|
| JP | 2009-258802 A | 11/2009 |
| JP | 2009-301123 A | 12/2009 |
| JP | 2014-106786 A | 6/2014 |
| JP | 2017-056747 A | 3/2017 |
| JP | 2017-182568 A | 10/2017 |
| JP | 2018-097644 A | 6/2018 |

* cited by examiner

NOTIFICATION DEVICE

CROSS-REFERENCE TO RELATED APPLICATION

This application claims the benefit of priority from Japanese Patent Application No. 2018-235499, filed on Dec. 17, 2018, the entire contents of which are incorporated herein by reference.

TECHNICAL FIELD

The present disclosure relates to a notification device that notifies a driver of a host vehicle about information of around objects.

BACKGROUND

For example, Patent Literature (Japanese Unexamined Patent Publication No. 2018-097644) describes a device that predicts a movement of a preceding vehicle ahead of a host vehicle and outputs an alarm sound if it is determined that the proceeding vehicle cuts in ahead of the host vehicle. Therefore, owing to the alarm sound, the driver of the host vehicle is capable of identifying that the preceding vehicle is cutting in.

SUMMARY

The device described in Patent Literature (Japanese Unexamined Patent Publication No. 2018-097644) enables the driver to identify only that the preceding vehicle is merely cutting in, based on a notification sound. For this reason, in the technical field, it is desirable to employ a configuration capable of properly notifying a driver about information of objects around a host vehicle.

According to the present disclosure, there is provided a notification device that notifies a driver of a host vehicle about information of an object around the host vehicle, the device including an object detection unit configured to detect a position of the object and a relative condition of the object with respect to the host vehicle, based on a detection result of an external sensor; a virtual sound source setting unit configured to set a virtual sound source around the driver, based on the detected position of the object; a sound output unit configured to output a notification sound to the driver; and a sound output control unit configured to output the notification sound from the sound output unit such that the driver identifies that the notification sound in response to the relative condition has come from a direction of the set virtual sound source, based on the set virtual sound source and the relative condition.

The notification device sets the virtual sound source around the driver based on the detected position of the object, and outputs the notification sound such that the driver identifies that the notification sound has come from the direction of the virtual sound source. Therefore, the driver is capable of identifying position-based information of the object, such as a presence direction of the object, based on the direction from which the notification sound is coming. In addition, the notification device outputs the notification sound in response to the relative condition. Therefore, the driver is capable of identifying the relative condition based on the notification sound. As described above, the notification device is capable of notifying the position-based information and the relative condition of the object, using the notification sound. As a result, the notification device is capable of properly notifying the driver about the information of the object around the host vehicle.

The virtual sound source setting unit may be configured to move the virtual sound source based on at least one of the detected position of the object and a position of the object which is predicted based on the detected position of the object. In this case, the notification device is capable of properly notifying the driver, for example, easily drawing driver's attention to a direction, to which the attention is desired to be drawn, by moving the virtual sound source.

The notification device may further include an interference determination unit configured to determine whether or not the detected object has a potential for interfering with the host vehicle. The sound output control unit may be configured to output the notification sound for the object that is determined to have the potential for interfering with the host vehicle by the interference determination unit, and to not output the notification sound for the object that is determined to have no potential for interfering with the host vehicle by the interference determination unit. In this case, the notification device is capable of not performing notification for the object with low needs for notification due to having no potential for interfering with the host vehicle, and is capable of performing notification only for the object with high needs for notification due to having a potential for interfering with the host vehicle.

The notification device may further include a non-target setting unit configured to set the object for which notification using the notification sound is not performed, based on an input operation performed by the driver. The sound output control unit may be configured to not output the notification sound for the object set as the object for which notification using the notification sound is not performed. In this case, since notification is not performed for the object for which no notification is needed due to the input from the driver, the notification device is capable of preventing the notification sound from being unnecessarily output.

The notification device may further include a line-of-sight direction detecting unit configured to detect a line of sight direction of the driver or a direction to which a face of the driver points, as a driver's line of sight direction. The sound output control unit may be configured to output the notification sound from the sound output unit in response to a deviation between a direction of the virtual sound source with respect to the driver and the driver's line of sight direction. In this case, by outputting the notification sound in response to the deviation between the direction of the virtual sound source and the driver's line of sight direction, the notification device is capable of notifying the driver that the line of sight direction (driver's line of sight direction) has deviated. The notification device is capable of prompting the driver to turn the driver's line of sight direction to the direction of the virtual sound source, using the notification sound in response to the deviation.

The notification device may further include a light notification unit configured to notify the driver using light; and a light emission control unit configured to cause the light notification unit to emit light in response to the relative condition. In this case, the notification device is capable of notifying the driver about the information of the nearby object, using the notification sound and the light emitted from the light notification unit. In addition, even though the light emitted from the light notification unit, or the like draws driver's attention, the notification device is capable of drawing driver's attention also to the object for which notification using the notification sound is performed.

As described above, according to the present disclosure, it is possible to properly notify the driver about the information of the object around the host vehicle.

DETAILED DESCRIPTION

Hereinbelow, embodiments will be described with reference to the drawings. In the following description, the same reference signs will be assigned to the same or equivalent elements, and duplicated descriptions of the same or equivalent elements will be omitted.

First Embodiment

Figure 1:
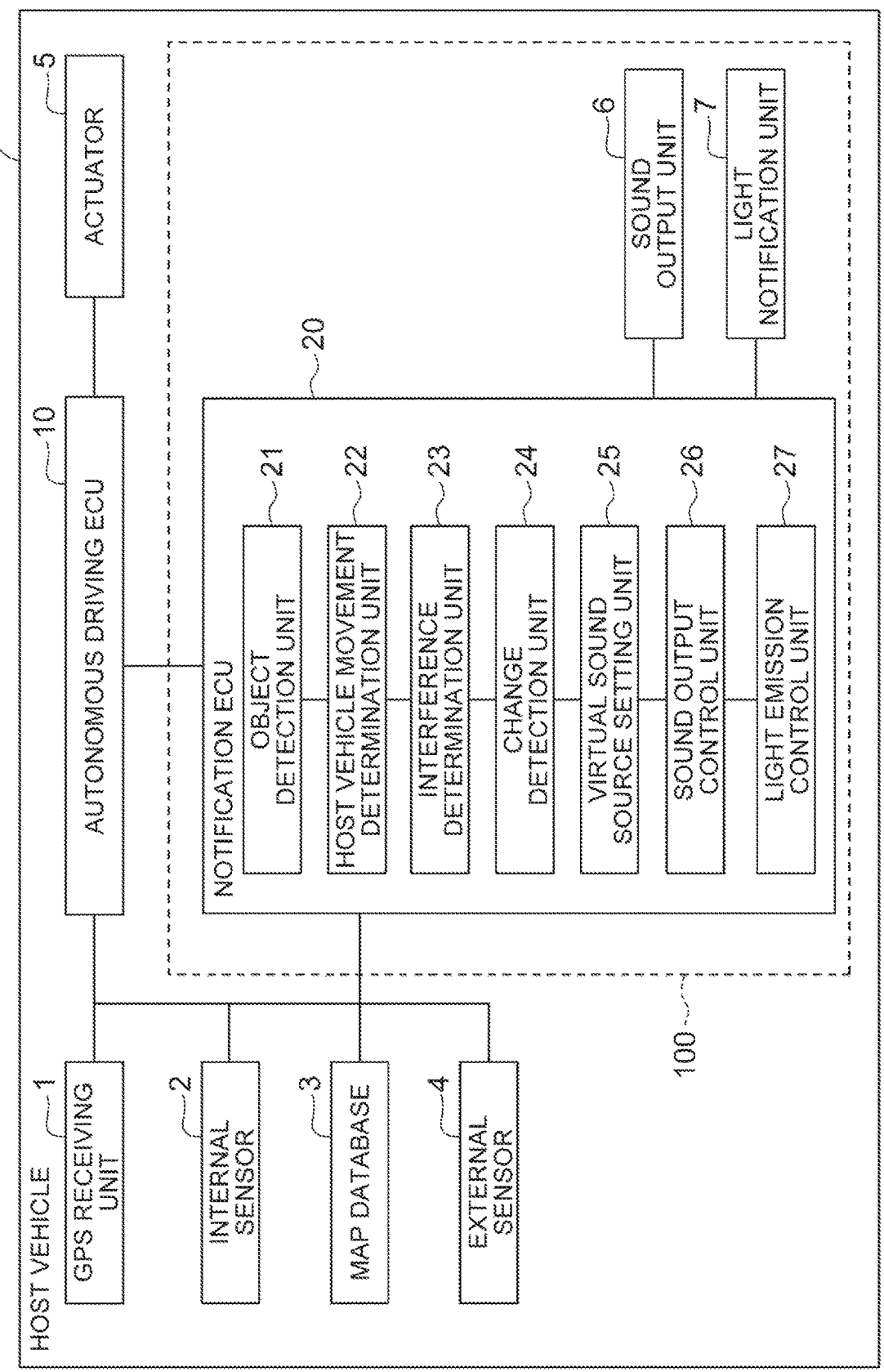
FIG. 1 is an example of functional block diagram of a vehicle including a notification device of a first embodiment.

Firstly, a first embodiment will be described. As illustrated in FIG. 1, a notification device 100 of the first embodiment is installed in a host vehicle V such as passenger car capable of autonomous driving. The autonomous driving is vehicle control by which the host vehicle V autonomously travels to a preset destination. In the autonomous driving, the driver does not need to drive, and the host vehicle V travels autonomously. The notification device 100 notifies the driver of the host vehicle V about information of objects around the host vehicle V. The notification device 100 notifies information of objects around the host vehicle V, for example, while the host vehicle V is in autonomous driving mode.

The host vehicle V includes a GPS receiving unit 1; an internal sensor 2; a map database 3; an external sensor 4; an actuator 5; an autonomous driving ECU 10; and the notification device 100.

The GPS receiving unit 1 acquires position information indicative of the position of the host vehicle V by receiving signals from three or more GPS satellites. The position information contains, for example, a latitude and longitude. Instead of the GPS receiving unit 1, other means for being capable of specifying a latitude and longitude of the host vehicle V may be used.

The internal sensor 2 is a detection device that detects a travel condition of the host vehicle V. The internal sensor 2 contains a vehicle speed sensor, an acceleration sensor, and a yaw rate sensor. The vehicle speed sensor is a detector that detects a speed of the host vehicle V. A wheel speed sensor is used as the vehicle speed sensor, and is provided in a wheel of the host vehicle V, a drive shaft rotating integrally with wheels, or the like to detect a rotational speed of the wheel.

The acceleration sensor is a detector that detects an acceleration of the host vehicle V. The acceleration sensor may contain a longitudinal acceleration sensor that detects an acceleration of the vehicle V in a forward and backward direction, and a lateral acceleration sensor that detects a lateral acceleration of the host vehicle V. The yaw rate sensor is a detector that detects a yaw rate (rotation angular speed) of the host vehicle V around a vertical axis of gravity. For example, a gyro sensor can be used as the yaw rate sensor.

The map database 3 is a storage device storing map information. The map database 3 is stored, for example, in a hard disk drive (HDD) installed in the host vehicle V. The map database 3 contains information of stationary objects, traffic rules, the positions of traffic signals, and the like in the map information. The stationary objects are road surface paints (including lane-boundary lines such as white line and yellow line), structures (curbs, poles, utility poles, buildings, signs, trees, and the like), and the like. Part of the map information contained in the map database 3 may be stored in a storage device that is different from the HDD in which the map database 3 is stored. Part or the entirety of the map information contained in the map database 3 may be stored in a server capable of communicating with the host vehicle V.

The external sensor 4 is a detection device that detects an external situation of the host vehicle V. The external sensor 4 contains at least one of a camera and a radar sensor.

The camera is an image capturing device that captures images of situations around the host vehicle V. The camera is provided, as an example, on the back side of a front windshield of the host vehicle V. The camera acquires image information of the external situation of the host vehicle V as a detection result for the external situation. The camera may be a monocular camera or a stereo camera. The stereo camera has two imaging units disposed to reproduce binocular parallax. Image information obtained by the stereo camera contains depth information.

The radar sensor is a detection device that detects the situations around the host vehicle V by using radio waves (for example, millimeter waves) or light. Examples of the radar sensor include a millimeter wave radar and a light detection and ranging (LIDAR). The radar sensor acquires a detection result for the external situation of the host vehicle V by transmitting radio waves or light to the surroundings of the host vehicle V and receiving radio waves or light reflected by objects.

The actuator 5 is a device that controls the traveling of the host vehicle V. The actuator 5 contains at least an engine actuator, a brake actuator, and a steering actuator. The engine actuator controls the driving force of the host vehicle V by changing (for example, changing a throttle opening) the amount of air being supplied to an engine in response to control signals from the autonomous driving ECU 10. If the host vehicle V is a hybrid or electric vehicle, the engine actuator controls the driving force of a motor which is a power source.

The autonomous driving ECU 10 controls the autonomous driving of the host vehicle V. The autonomous driving ECU 10 is an electronic control unit having a central processing unit (CPU), a read only memory (ROM), a random access memory (RAM), a controller area network (CAN) communication circuit, and the like. The autonomous driving ECU 10 realizes the autonomous driving control, for example, by inputting and outputting data by operating the CAN communication circuit based on signals output from the CPU, storing the data in the RAM, loading a ROM-stored program into the RAM, and executing the program loaded into the RAM. The autonomous driving ECU 10 may be configured to include a plurality of electronic control units. The autonomous driving ECU 10 may be an electronic control unit integral with a notification ECU 20 provided in the notification device 100.

The autonomous driving ECU 10 generates a trajectory (path and vehicle speed profile) along a preset target route, for example, based on the position of the host vehicle V, the map information of the map database 3, the situations around the host vehicle V obtained from the detection results of the external sensor 4, and the conditions (vehicle speed, yaw rate, and the like) of the vehicle obtained from the detection results of the internal sensor 2. The target route may be manually set by the driver of the host vehicle V, or may be automatically set by a well-known navigation system or the autonomous driving ECU 10. The autonomous driving ECU 10 is capable of generating the trajectory using a well-known technique. The autonomous driving ECU 10 autonomously drives the host vehicle V along the trajectory by transmitting control signals the actuator 5 (the engine actuator, the brake actuator, the steering actuator, and the like) of the host vehicle V.

The notification device 100 includes a sound output unit 6; a light notification unit 7; and the notification ECU 20. The sound output unit 6 is controlled to output a notification sound to the driver of the host vehicle V by the notification ECU 20. The notification sound is a sound for notifying information of an object around the host vehicle V. As described above, the notification device 100 notifies the driver of the host vehicle V about the information of the object around the host vehicle V by outputting the notification sound from the sound output unit 6.

Herein, the notification device 100 sets a virtual sound source around the driver based on the detected position of the object, and outputs a notification sound from the sound output unit 6 such that the driver identifies that the notification sound has come from the direction of the set virtual sound source. The notification device 100 is capable of changing a direction from which the notification sound is coming to the driver, by changing the position of the virtual sound source with respect to the driver. Namely, the sound output unit 6 is configured able to output a notification sound such that the driver identifies that the notification sound has come from the direction of the set virtual sound source.

Specifically, for example, the notification device 100 may output a notification sound such that the driver identifies that the notification sound has come from the direction of the set virtual sound source, using the sound field synthesis method which is a well-known technique. The sound field synthesis method is a method for generating a sound field, which is equivalent to the sound field generated when the notification sound is output from the position of the set virtual sound source, by controlling the sound volume (amplitude) and the phase (drive timing of a speaker) of sound output from each of a plurality of speakers. Therefore, the driver feels that the notification sound has come from the position (direction) of the set virtual sound source. If the sound field synthesis method is used, the sound output unit 6 includes a plurality of speakers disposed around the driver inside the host vehicle V.

Figure 2:
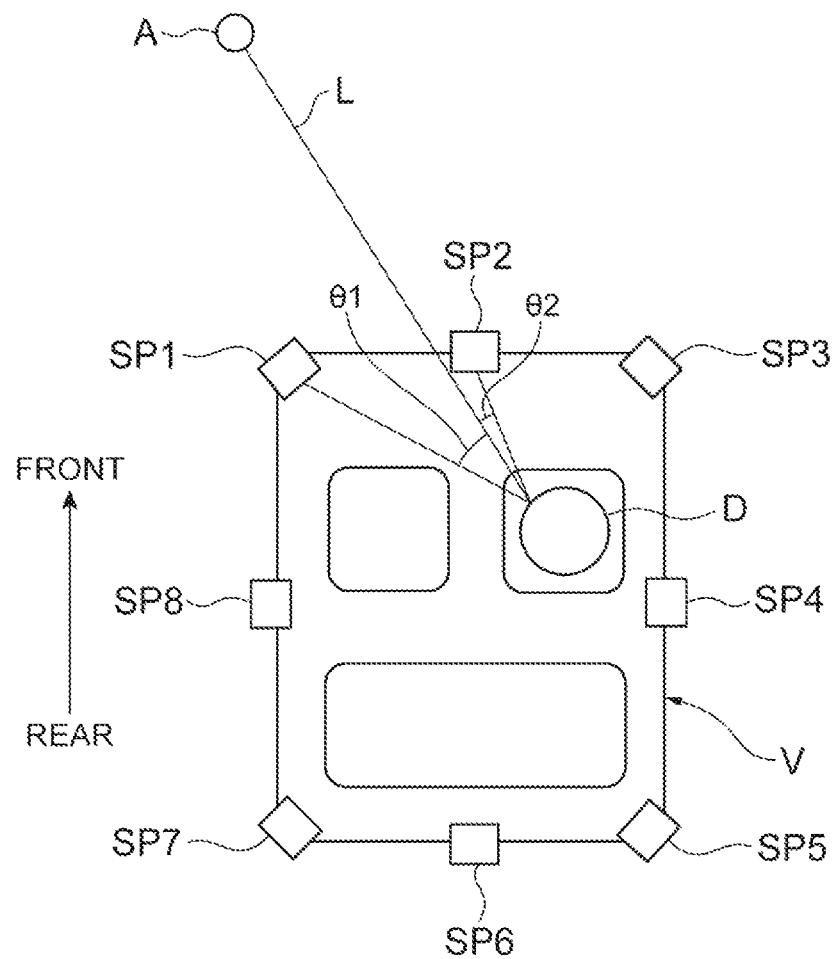
FIG. 2 is a view illustrating an example of configuration of a sound output unit when the interior of a host vehicle is seen from above.

The sound field synthesis method referred to herein requires a sufficient number of speakers. For this reason, it is not possible to accurately perform sound synthesis because a small number of speakers are installed in the host vehicle V. For this reason, for example, the notification device 100 may output a notification sound such that the driver identifies that the notification sound has come from the direction of the set virtual sound source, using the pseudo technique which will be described hereinbelow. For example, as illustrated in FIG. 2, speakers $SP_n$ (n=1 to 8) for outputting sounds to a driver D are disposed around the driver D in the host vehicle V. Namely, the sound output unit 6 includes speakers SP1 to SP8. A virtual sound source A is set around the driver D based on the detected position of the object. An angle $\theta_n$ (n=1 to 8) is an angle formed by a straight line L connecting the virtual sound source A to the driver D and a straight line connecting each of the speakers $SP_n$ to the driver D.

The notification device 100 may select the speaker $SP_n$ corresponding to a minimum angle $\theta_n$, based on the angles $\theta_n$, and output a notification sound from the selected speaker $SP_n$. Namely, if the pseudo technique is used, the notification device 100 may output a notification sound from the speaker $SP_n$ corresponding to the minimum angle $\theta_n$ such that the driver identifies that the notification sound has come from the direction of the set virtual sound source A.

In the example illustrated in FIG. 2, the angle $\theta_2$ is minimum. For this reason, the notification device 100 outputs a notification sound from the speaker SP2. In addition, a sound volume output from the speaker $SP_n$ may be attenuated in response to the angle $\theta_n$. As an example, a sound volume M of a notification sound output from the speaker $SP_n$ may be expressed the following equation (1). In the following equation, $M_0$ and $\sigma$ are predetermined constants.

$$M=M_0 exp(-\theta_n^2/\sigma^2) \qquad (1)$$

In addition, in the example illustrated in FIG. 2, in addition to from the speaker SP2, the notification device 100 may output a notification sound also from the speaker SP1 disposed at a second smallest angle $\theta_n$. In this case, the sound volume of the notification sound output from the speaker SP1 may be the same as that of the notification sound from the speaker SP2, or may a sound volume of the speaker SP1, which is calculated in the equation (1). Furthermore, similar to the speaker SP2, the notification device 100 may output a notification sound also from the speaker SP3 in addition to the speakers SP1 and SP2. As the speaker $SP_n$ which becomes a target outputting a notification sound, the notification device 100 may use the speaker $SP_n$ disposed at the angle $\theta_n$ satisfying $-90°<\theta_n<90°$. If the pseudo technique is used as described above, the sound output unit 6 includes a plurality of speakers disposed around the driver inside the host vehicle V. The number of the speakers when the pseudo technique is used may be less than the number of the speakers when the sound field synthesis method is used.

In addition, for example, the notification device 100 may output a notification sound such that the driver identifies that the notification sound has come from the direction of the set virtual sound source, using the head-related transfer function which is a well-known technique. For example, until a sound from a sound source reaches the right ear, the sound volume and the phase of the sound changes dependent on a distance and a direction from the sound source to the ear. A head-related transfer function $h_R$ is a function representing the change. In this case, a sound $X_R$ actually reaching the right ear is a sound obtained by computing an original sound x output from the sound source and the head-related transfer function $h_R$. Similarly, a sound $X_L$ actually reaching the left ear is a sound obtained by computing the original sound x output from the sound source and a head-related transfer function $h_L$. It is possible to change the distance from the driver to the virtual sound source and the direction of the virtual sound source with respect to the driver by making use of the head-related transfer functions. The head-related transfer functions $h_R$ and $h_L$ are functions determined by the distance and the direction from the driver to the virtual sound source. The head-related transfer functions may be measured in advance and built into a database for various distances and directions from the driver to the virtual sound source. The driver, who has heard the sound $X_R$ to the right year and the sound $X_L$ to the left ear, feels that the sounds have come from the position of the set virtual sound source. In this case, the sound output unit 6 includes speakers disposed at positions close to the ears of the driver. For example, the sound output unit 6 may include speakers in close contact with the ears such as headphones or earphones, or may include speakers provided in a headrest of a seat in which the driver sits.

The notification device 100 may output a notification sound from the sound output unit 6 such that the driver identifies that the notification sound has come from the direction of the set virtual sound source, using methods other than the sound field synthesis method and the like. In this case, the sound output unit 6 may be configured able to output a notification sound corresponding to a method used by the notification device 100.

The light notification unit 7 is a device that notifies the driver of the host vehicle V using light. The light notification unit 7 is capable of changing a light-emitting mode based on control from the notification ECU 20. The light notification unit 7 may be a display disposed toward the driver, a head-up display, a display device for displaying the speed and the like of the host vehicle V, a lamp, or the like. The light notification unit 7 may change display contents, the color or luminance of emitted light, and the like by changing the light-emitting mode. As described above, the notification device 100 notifies the driver of the host vehicle V about information of the object around the host vehicle V using light by causing the light notification unit 7 to emit light.

Similar to the autonomous driving ECU 10, the notification ECU 20 is an electronic control unit having a CPU, a ROM, a RAM, a CAN communication circuit, and the like. The notification ECU 20 functionally includes an object detection unit 21; a host vehicle movement determination unit 22; an interference determination unit 23; a change detection unit 24; a virtual sound source setting unit 25; a sound output control unit 26; and a light emission control unit 27.

The object detection unit 21 detects objects around the host vehicle V based on a detection result for the external situation detected by the external sensor 4. The object detection unit 21 detects other vehicles, pedestrians, poles installed on roads to separate lanes from each other, and the like as objects. The object detection unit 21 may detect objects from the detection result of the external sensor 4 using map information representing the 3D shapes of roads and objects around the roads, templates showing the appearances of vehicles and pedestrians, and the like. The object detection unit 21 identifies the types (types such as vehicle, pedestrian, and pole) of the detected objects. The object detection unit 21 is capable of using a well-known technique in detecting objects and identifying the types of the objects.

More specifically, based on the detection result for the external situation detected by the external sensor 4, the object detection unit 21 detects the positions of objects around the host vehicle V and relative conditions of the objects with respect to the host vehicle V. The position of an object referred to herein represents a position (namely, relative position) where the object is present with respect to the host vehicle V serving as a datum point. In addition, a relative condition of an object with respect to the host vehicle V represents a condition of the object relative to the host vehicle V. The relative condition of the object with respect to the host vehicle V may contain a relative speed between the host vehicle V and the object, a relative distance between the host vehicle V and the object, a time to collision (TTC) between the host vehicle V and the object, a potential (probability) for the object interfering with the host vehicle V, and the like.

In the present embodiment, as an example, the object detection unit 21 assigns an object ID to a detected object, and associates the object ID, the type of the identified object, and a detected relative condition with each other. The object detection unit 21 performs detection while tracking down each detected object (each object ID). The object ID is taken over and used also by each configuration element of the notification ECU 20 other than the object detection unit 21. The notification device 100 performs notification for each object ID assigned by the object detection unit 21.

The host vehicle movement determination unit 22 calculates a trajectory of the host vehicle V. In the present embodiment, as the trajectory of the host vehicle V, the host vehicle movement determination unit 22 uses a trajectory generated by the autonomous driving ECU 10. The host vehicle movement determination unit 22 is not limited to acquiring the trajectory from the autonomous driving ECU 10, and may calculate the trajectory by performing the same process as that of the autonomous driving ECU 10. As described above, the trajectory calculated (acquired) by the host vehicle movement determination unit 22 contains the path and the vehicle speed profile of the host vehicle V. The trajectory calculated by the host vehicle movement determination unit 22 contains absolute coordinates as the path, and may further contain the orientation of the host vehicle V.

The interference determination unit 23 determines whether or not the object detected by the object detection unit 21 has a potential for interfering with the host vehicle V. For example, if the host vehicle V travels along the trajectory, as the object having a potential for interference, the interference determination unit 23 is capable of determining an object having a potential for interference greater than a predetermined threshold value.

Herein, for example, if the object detected by the object detection unit 21 is a moving object such as other vehicles, the interference determination unit 23 predicts the position of the object based on a change in the position of the object. The interference determination unit 23 may determine whether or not the object has a potential for interfering with the host vehicle V, based on the predicted position of the object and the trajectory of the host vehicle V calculated by the host vehicle movement determination unit 22. In addition, for example, if the object detected by the object detection unit 21 is a non-moving object such as pole, the interference determination unit 23 may determine whether or not the object has a potential for interfering with the host vehicle V, based on the detected position of the object and the trajectory of the host vehicle V calculated by the host vehicle movement determination unit 22. Hereinbelow, an object determined to have a potential for interference by the interference determination unit 23 is referred to as an "interfering object".

The interference determination unit 23 determines the potential for interference based on the trajectory containing the path and the vehicle speed profile. The interference determination unit 23 is not limited to using the determination method, and based on the travel path of the host vehicle V, the interference determination unit 23 may determine whether or not the object detected by the object detection unit 21 has a potential for interference.

The change detection unit 24 detects whether or not there is a change in the interfering object determined by the interference determination unit 23. If there is a change (such as speed change caused by braking or accelerating the vehicle, orientation change caused by a steering operation of the vehicle, or pedestrian suddenly jumping out) in the interfering object, the potential for interfering with the host vehicle V may increase. For this reason, the notification device 100 is capable of effectively performing notification by notifying the driver about information of the interfering object undergoing the change. Specifically, the change detection unit 24 detects a change in the interfering object based on the generation (formation) or extinction of the interference object, the separation or degeneration of the interference object, a change in the size or shape of the interference object, a change in the position of the interference object or the orientation of the interfering object with respect to the host vehicle V, a change in the type of the interference object, a change in the potential for interference between the host vehicle V and the interference object, a change in predicted movement of the interference object, a change in the reliability of detection of the interference object by the object detection unit 21, and the like. In addition to containing a change in the speed and the like of the interfering object, the change in the interfering object detected by the change detection unit 24 contains also a change induced due to variations (errors) in the detection of objects performed by the object detection unit 21 based on a detection result of the external sensor 4.

The virtual sound source setting unit 25 sets a virtual sound source around the driver, based on the position of the object detected by the object detection unit 21. In the present embodiment, the virtual sound source setting unit 25 sets the virtual sound source around the driver, based on the position of an interfering object detected to have a change (detected that there is a change) by the change detection unit 24 among objects detected by the object detection unit 21. In addition, if a plurality of interfering objects are detected to have a change, the virtual sound source setting unit 25 sets a virtual sound source for each interfering object.

In the present embodiment, as the position of the virtual sound source set around the driver, the virtual sound source setting unit 25 uses the position of the interfering object detected to have a change. Namely, when seen from the driver, the presence direction of the interfering object detected to have a change coincides with the direction of the virtual sound source.

The sound output control unit 26 outputs a notification sound from the sound output unit 6 such that the driver identifies that the notification sound in response to the relative condition has come from the direction of the set virtual sound source, based on the virtual sound source set by the virtual sound source setting unit 25 and the relative condition detected by the object detection unit 21. Namely, the sound output control unit 26 notifies vector information indicative of the presence direction and the relative condition of the interfering object detected to have a change, using the notification sound.

In addition, the sound output control unit 26 determines at least one of, for example, a sound volume (amplitude), a frequency, and a sound tempo in response to the relative condition, and outputs a notification sound at the determined sound volume or the like from the sound output unit 6 as the notification sound in response to the relative condition.

If a plurality of virtual sound sources are set around the driver, the sound output control unit 26 outputs a notification sound for each virtual sound source from the sound output unit 6 such that the driver identifies that the notification sound has come from the direction of each of the set virtual sound sources. Namely, the sound output control unit 26 outputs the notification sounds from the sound output unit 6 such that the notification sounds for the virtual sound sources are synthesized.

Herein, as described above, the notification device 100 is capable of outputting the notification sound such that the driver identifies that the notification sound has come from the direction of the set virtual sound source, using various methods such as the sound field synthesis method. By controlling the sound output unit 6 in response to a method used, the sound output control unit 26 outputs a notification sound from the sound output unit 6 such that the driver identifies that the notification sound has come from the direction of the set virtual sound source.

In the present embodiment, as an example, the sound output control unit 26 generates a sound signal, and outputs a notification sound by inputting the generated sound signal into the sound output unit 6. Specifically, the sound output control unit 26 generates an object sound signal for outputting a notification sound based on the set virtual sound source and the relative condition. If a plurality of virtual sound sources are set, the sound output control unit 26 generates an object sound signal for each notification sound (each virtual sound source). The sound output control unit 26 generates a sound signal for controlling the sound output unit 6, based on the object sound signal. If only one virtual sound source is set, the sound output control unit 26 uses the generated object sound signal as a sound signal. If the plurality of the virtual sound sources are set, the sound output control unit 26 generates a sound signal by synthesizing a plurality of the object sound signals generated for the virtual sound sources. The sound output control unit 26 outputs a notification sound from the sound output unit 6 by inputting the generated sound signal into the sound output unit 6. If only one virtual sound source is set, only one notification sound is output. If the plurality of virtual sound sources are set, a plurality of notification sounds in a synthesized state are output from the sound output unit 6.

Therefore, the notification device 100 is capable of notifying the driver about the presence direction and the relative condition of an interfering object detected to have a change, using a notification sound. In addition, even though a plurality of interfering objects are detected to have a change, the notification device 100 is capable of notifying the driver about the presence direction and the relative condition of each interfering object using a synthesized notification sound.

An interfering object for which a virtual sound source is set is an object that is determined to have a potential for interfering with the host vehicle V by the interference determination unit 23. Namely, the sound output control unit 26 outputs a notification sound for an object that is determined to have a potential for interfering with the host vehicle V by the interference determination unit 23, and does not output a notification sound for an object that is determined to have no potential for interfering with the host vehicle V by the interference determination unit 23.

If the sound field synthesis method, the method using the head-related transfer function, or the like is used, the notification device 100 is capable of outputting a notification sound such that the driver identifies that the notification sound has come from the direction of the set virtual sound source. In this case, the sound output control unit 26 may output a notification sound from the sound output unit 6 such that the driver identifies not only the direction of the set virtual sound source but also that the notification sound has come from the position of the virtual sound source. Therefore, the driver who has heard the notification sound is capable of identifying the position of the virtual sound source (the direction of the virtual sound source and the distance to the virtual sound source).

The light emission control unit 27 causes the light notification unit 7 to emit light based on the relative condition of the object detected by the object detection unit 21. Namely, the light emission control unit 27 notifies scalar information indicative of the relative condition, using light emitted from the light notification unit 7. In the present embodiment, as a target object, the information of which is notified using the light notification unit 7, the light emission control unit 27 uses the interfering object determined by the interference determination unit 23, among the objects detected by the object detection unit 21. Furthermore, in the present embodiment, as a target object, the information of which is notified using the light notification unit 7, the light emission control unit 27 uses the interfering object detected to have a change (detected that there is a change) by the change detection unit 24 among the interfering objects determined by the interference determination unit 23.

If a plurality of interfering objects are detected to have a change, the light emission control unit 27 uses one interfering object, which is selected based on a predetermined selection condition among the plurality of interfering objects detected to have a change, as a target object, the information of which is notified using the light notification unit 7. In the present embodiment, the light emission control unit 27 uses the potential for interfering with the host vehicle V as the predetermined selection condition. In this case, the light emission control unit 27 causes the light notification unit 7 to emit light, specifically, based on the relative condition of an interfering object having the highest potential for interfering with the host vehicle V among the plurality of interfering objects detected to have a change.

The light emission control unit 27 causes the light notification unit 7 to emit light in a light-emitting mode in response to the relative condition by causing the light notification unit 7 to emit light in response to the relative condition. For example, in response to the potential for interfering with the host vehicle V, the light emission control unit 27 may change the color, luminance, or the like of light emitted by the light notification unit 7. For example, the light emission control unit 27 causes the light notification unit 7 to emit green light if the potential for interference is low, and the light notification unit 7 to emit red light if the potential for interference is high.

Therefore, the notification device 100 is capable of notifying the driver about the relative condition of the interfering object detected to have a change, using light emitted from the light notification unit 7. In addition, if the plurality of interfering objects are detected to have a change, the notification device 100 is capable of notifying the driver about a relative condition of the interfering object having the highest potential for interfering with the host vehicle V, using light emitted from the light notification unit 7.

Figure 3:
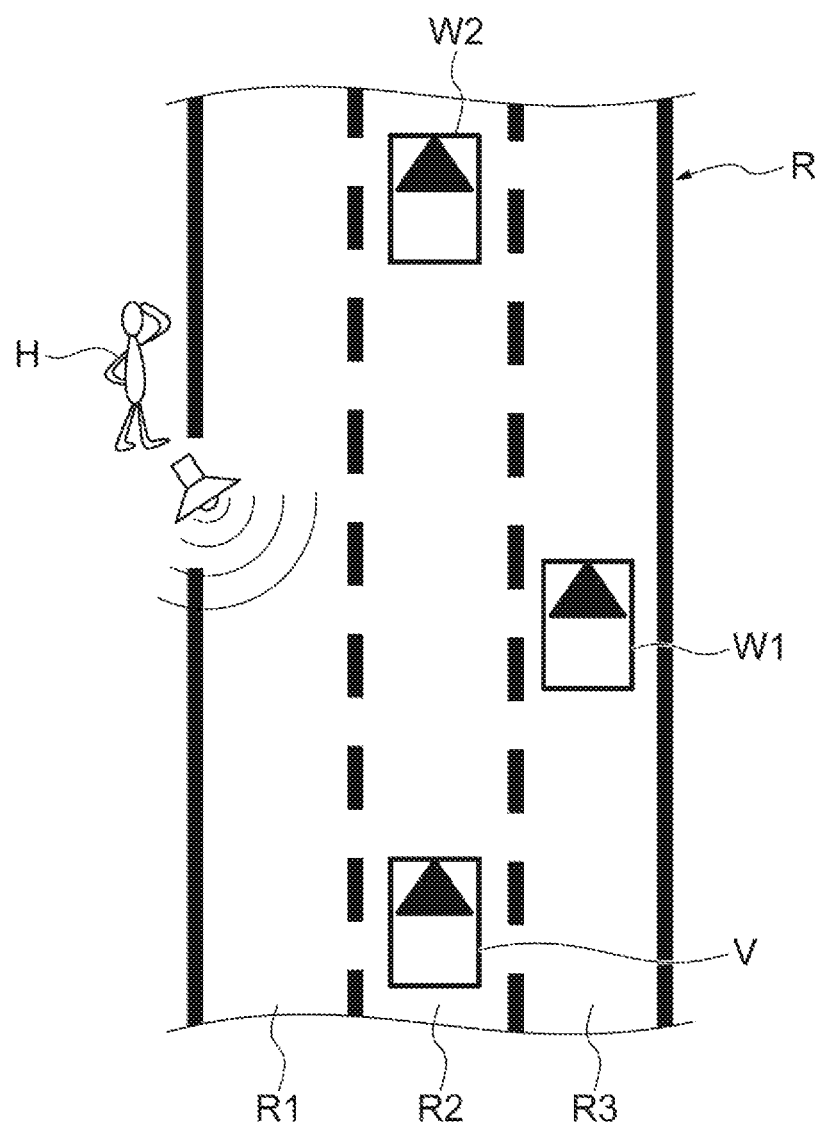
FIG. 3 is a plan view of surroundings of the host vehicle illustrating an example of external situation of the host vehicle.

Subsequently, a description will be given on a specific example of notifying information using a notification sound output from the notification device 100 and light emitted from the light notification unit 7. For example, as illustrated in FIG. 3, the host vehicle V travels in a lane R2 of a road R with lanes R1 to R3. A first other vehicle W1 travels in the lane R3 at a location obliquely right forward of the host vehicle V. A second other vehicle W2 travels further ahead of the first other vehicle W1 in the lane R2. The pedestrian H located on a left roadside of the road R and obliquely left forward of the host vehicle V intends to cross the road R.

In this case, the object detection unit 21 detects the positions and relative conditions of the first other vehicle W1, the second other vehicle W2, and the pedestrian H. The pedestrian H intends to cross the road R. For this reason, the interference determination unit 23 determines the pedestrian H as an interfering object. For example, since the potential for interference between the host vehicle V and the pedestrian H has changed (has increased), the change detection unit 24 detects that there is a change in the pedestrian H. Namely, in the example illustrated in FIG. 3, only the pedestrian H becomes a target object which will be notified using a notification sound and light emitted from the light notification unit 7.

For this reason, the virtual sound source setting unit 25 sets a virtual sound source at the position of the pedestrian H. The sound output control unit 26 outputs a notification sound from the sound output unit 6 such that the driver identifies that the notification sound in response to the relative condition has come from the direction of the set virtual sound source (direction of the pedestrian H). As described above, the sound output control unit 26 is capable of notifying the presence direction and the relative condition of the pedestrian H using auditory stimulation such as outputting a notification sound from the sound output unit 6 based on the set virtual sound source and the relative condition.

Figure 4:
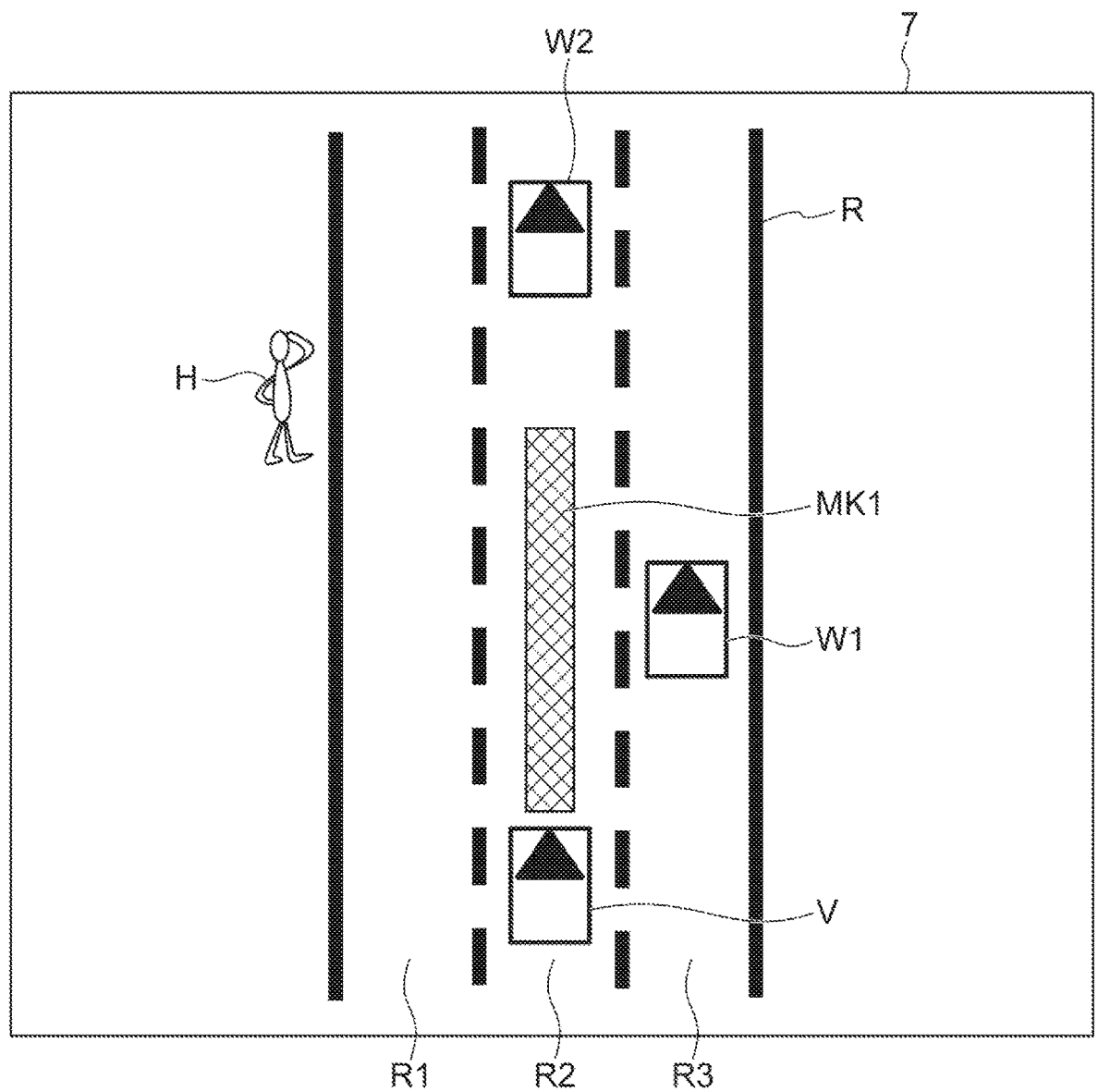
FIG. 4 is a view illustrating an example of display image displayed on a light notification unit which is a display.

On the other hand, the light emission control unit 27 notifies the driver of the host vehicle V about the relative condition of the pedestrian H using visual stimulation such as causing the light notification unit 7 to emit light in response to the relative condition of the pedestrian H. The light notification unit 7 is, for example, a display capable of displaying images. In addition, for example, as illustrated in FIG. 4, the light notification unit 7 displays an image illustrating an external situation of the host vehicle V seen from above. In this case, the light emission control unit 27 may display, for example, the time to collision when the pedestrian H starts crossing the road, on the light notification unit 7 as the relative condition of the pedestrian H. The light emission control unit 27 may display, for example, a bar-shaped marker MK1 having a length and a color in response to the time to collision, on the light notification unit 7 as the relative condition.

As described above, the notification device 100 is capable of notifying the driver of the host vehicle V about information of the pedestrian H using auditory stimulation and visual stimulation.

Figure 5:
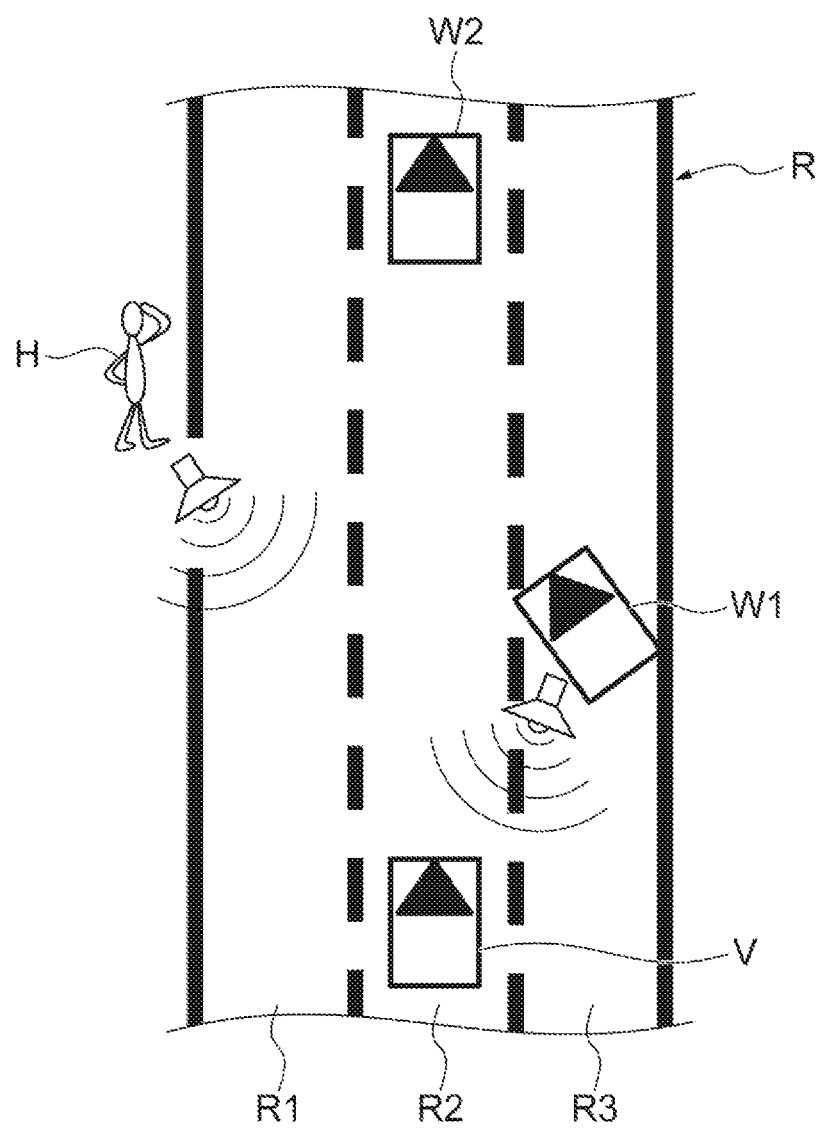
FIG. 5 is a plan view of surroundings of the host vehicle illustrating an example of external situation of the host vehicle.

Subsequently, a description will be given on a case where the first other vehicle W1 intends to suddenly cut in ahead of the host vehicle V in the lane R2 as illustrated in FIG. 5 while being braked from the situation illustrated in FIG. 3. In this case, the interference determination unit 23 determines the pedestrian H and the first other vehicle W1 as interfering objects. For example, since the potential for interference between the host vehicle V and the first other vehicle W1 has changed (has increased), the change detection unit 24 further detects that there is a change in the first other vehicle W1 in addition to the pedestrian H. Namely, in the example illustrated in FIG. 5, the pedestrian H and the first other vehicle W1 become target objects which will be notified using a notification sound and light emitted from the light notification unit 7.

For this reason, the virtual sound source setting unit 25 sets a virtual sound source at the position of the first other vehicle W1 in addition to the position of the pedestrian H. Namely, the virtual sound source setting unit 25 sets the virtual sound source for the pedestrian H and the virtual sound source for the first other vehicle W1. The sound output control unit 26 outputs a notification sound from the sound output unit 6 such that the driver identifies that the notification sound has come from the direction of each of the set virtual sound sources. Namely, in addition to outputting a notification sound for the pedestrian H, the sound output control unit 26 outputs a notification sound for the first other vehicle W1 from the sound output unit 6 such that the driver identifies that the notification sound in response to the relative condition of the first other vehicle W1 has come from the direction of the first other vehicle W1. As described above, the sound output control unit 26 is capable of notifying the presence direction and the relative condition of the pedestrian H and the presence direction and the relative condition of the first other vehicle W1 using auditory stimulation such as outputting a notification sound for the first other vehicle W1 in addition to a notification sound for the pedestrian H.

Figure 6:
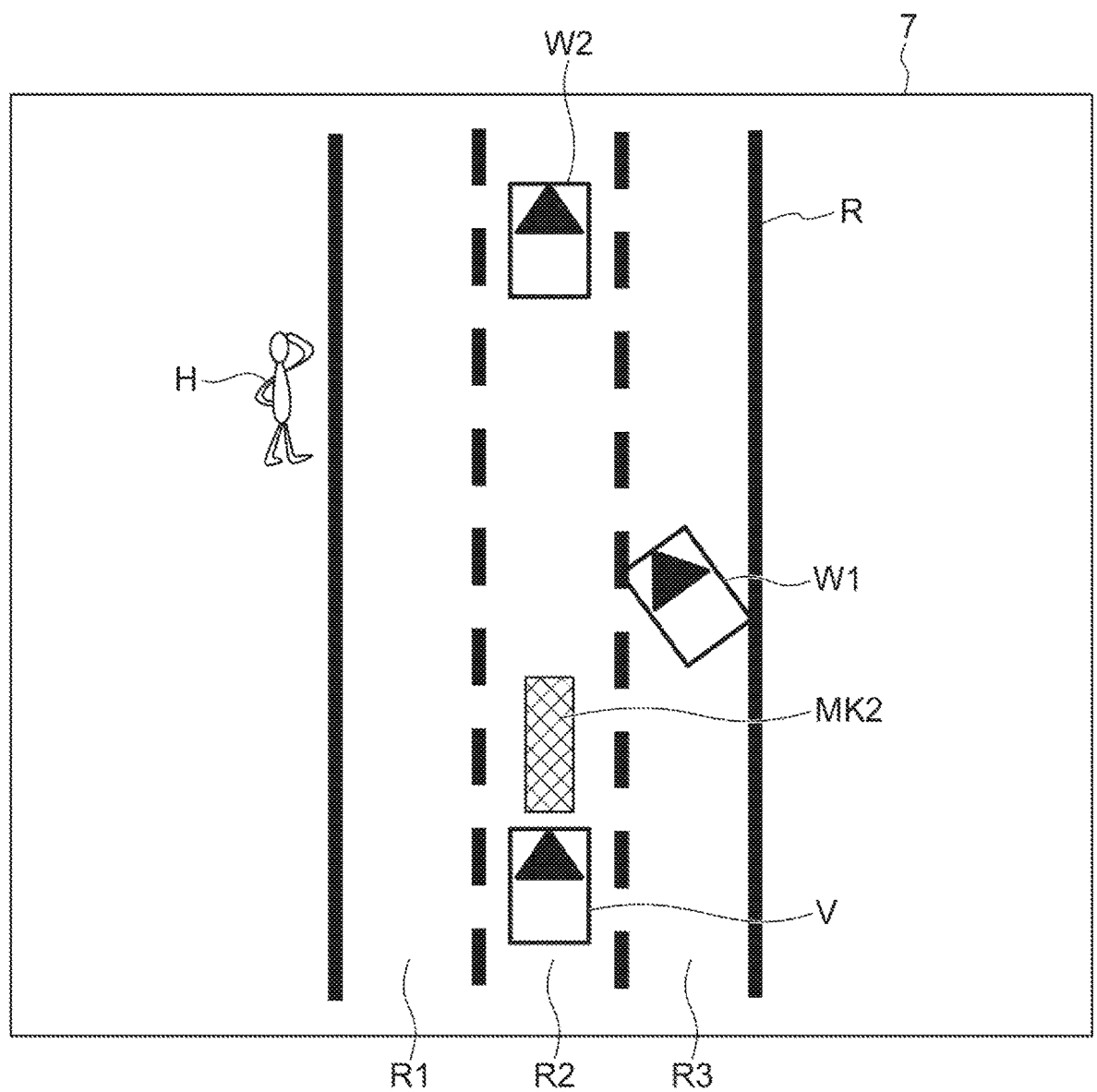
FIG. 6 is a view illustrating an example of display image displayed on the light notification unit which is a display.

On the other hand, the light emission control unit 27 selects an object having the highest potential for interference from the pedestrian H and the first other vehicle W1. In the present embodiment, as the object having the highest potential for interference, the light emission control unit 27 selects the first other vehicle W1 close to the host vehicle V. The light emission control unit 27 notifies the driver of the host vehicle V about the relative condition of the first other vehicle W1 using visual stimulation such as causing the light notification unit 7 to emit light in response to the relative condition of the first other vehicle W1. Specifically, as the relative condition of the first other vehicle W1, the light emission control unit 27 may display, for example, the time to collision between the host vehicle V and the first other vehicle W1 on the light notification unit 7. As illustrated in FIG. 6, the light emission control unit 27 may display, for example, a bar-shaped marker MK2 having a length and a color in response to the time to collision, on the light notification unit 7 as the relative condition. Since the time to collision between the host vehicle V and the first other vehicle W1 is shorter in the example illustrated in FIG. 6 compared to the example illustrated in FIG. 4, the length of the marker MK2 is short. In addition, for example, the light emission control unit 27 may use red color as the color of the marker MK2 in the example illustrated in FIG. 6, and use green color as the color of the marker MK1 in the example illustrated in FIG. 4.

As described above, the notification device 100 is capable of notifying the driver of the host vehicle V about the information of the pedestrian H and the first other vehicle W using auditory stimulation, and is capable of notifying the driver of the host vehicle V about the information of the first other vehicle W1 using visual stimulation.

Therefore, if the first other vehicle W1 cuts in ahead of the host vehicle V as illustrated in FIG. 5 from the situation illustrated in FIG. 3, the notification device 100 is capable of notifying a new potential for interfering with the first other vehicle W1 using auditory stimulation and visual stimulation while continuing to notify the presence of the pedestrian H by auditory stimulation using a notification sound. Therefore, the driver of the host vehicle V is likely to select an operation for avoiding interfering with the first other vehicle W1 by applying brake without taking an inappropriate action to increase the potential for interfering with the pedestrian H, such as steering the host vehicle V to the left due to being surprised by a change in movement of the first other vehicle W1.

If the information of the first other vehicle W1 is notified using visual stimulation, the driver tends to forget about the presence of the pedestrian H due to "attentional blindness", and pay attention only to the first other vehicle W1. The attentional blindness refers to the tendency of perceiving an object, to which no attention is paid, as not being present. Therefore, even though the pedestrian H is on the left side, the driver is likely to steer the host vehicle V to the left in order to avoid interfering with the first other vehicle W1 to which the driver pays attention. An action taken by the driver due to the attentional blindness is a reaction of the driver, which is difficult to avoid even though visual stimulation is given using a head-up display or the like or even though the first other vehicle W1 is displayed in a highlighted manner on an EL display or the like displaying a bird-eye image. In addition, even though two visual stimulations (herein, visual stimulations by the first other vehicle W1 and the pedestrian H) are simultaneously presented, only one visual stimulation is perceived from the viewpoint of perception, and furthermore, the process of selecting one visual stimulation may cause a delay in reaction of the driver.

On the contrary, if a method for notifying information of an object using auditory stimulation is used, it is possible to better prevent attentional blindness of the driver compared to when notification is performed using visual stimulation. For this reason, while preventing attentional blindness, the notification device 100 of the present embodiment is capable of notifying information of an object by performing notification using auditory stimulation. In the example illustrated in FIG. 5, owing to auditory stimulation, the driver of the host vehicle V is capable of noticing the first other vehicle W1 newly presented while continuing to identify the presence of the pedestrian H. In addition, in the present embodiment, the notification device 100 performs notification using a combination of auditory stimulation and visual stimulation. Specifically, the notification device 100 may perform notification for the first other vehicle W1 having a high potential for interference, also using visual stimulation in addition to auditory stimulation. Therefore, even though the driver pays attention to the first other vehicle W1 owing to visual stimulation, the notification device 100 enables the driver to continue to identify the presence of the pedestrian H using auditory stimulation. As described above, the notification device 100 is capable of properly notifying information of an object using visual stimulation and auditory stimulation.

Subsequently, the flow of a notification process performed by the notification ECU 20 of the notification device 100 will be described with reference to the flowchart of FIG. 7. The notification ECU 20 starts the notification process illustrated in FIG. 7 at a time the autonomous driving ECU 10 starts driving the host vehicle V autonomously. The notification process illustrated in FIG. 7 may start at a time other than when autonomous driving control starts. In addition, if the notification process illustrated in FIG. 7 has reached END, for example, after a predetermined time has elapsed, the notification ECU 20 restarts the process from START.

Figure 7:
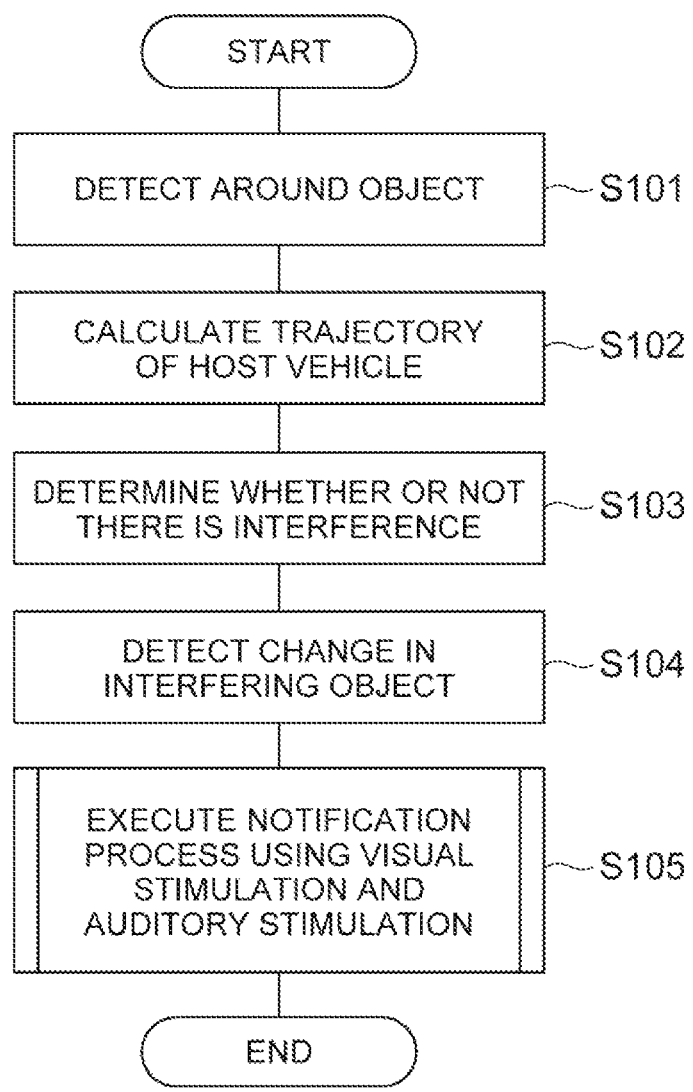
FIG. 7 is a flowchart illustrating the flow of a notification process performed by the notification device.

As illustrated in FIG. 7, the object detection unit 21 detects objects around the host vehicle V based on a detection result for the external situation detected by the external sensor 4 (S101). The host vehicle movement determination unit 22 calculates a trajectory of the host vehicle V (S102).

The interference determination unit 23 determines whether or not the object detected by the object detection unit 21 has a potential for interfering with the host vehicle V, based on the calculated trajectory of the host vehicle V (S103).

The change detection unit 24 detects whether or not there is a change in an interfering object that is determined to have a potential for interference by the interference determination unit 23 (S104). The notification ECU 20 notifies information of the interfering object detected to have a change, using visual stimulation and auditory stimulation (S105).

Figure 8:
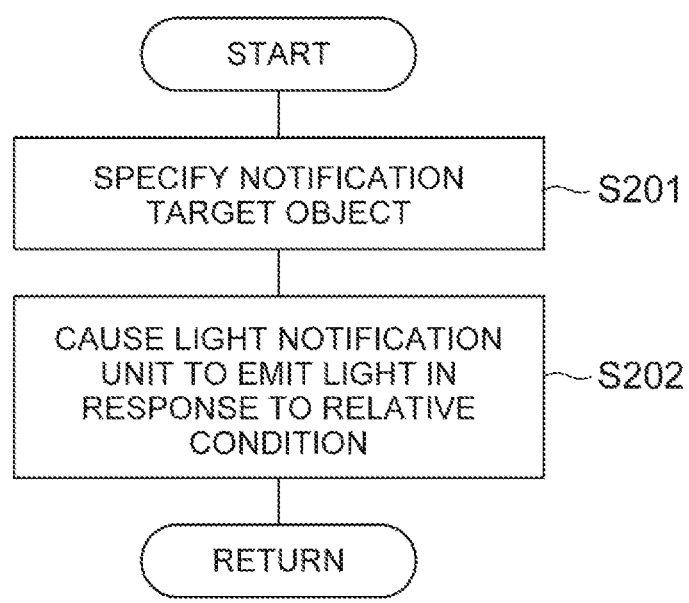
FIG. 8 is a flowchart illustrating the flow of a notification process using visual stimulation.

Subsequently, a detailed description will be given on the flow of S105 of FIG. 7 in the notification process using visual stimulation. As illustrated in FIG. 8, based on the predetermined selection condition, the light emission control unit 27 specifies a notification target object among interfering objects detected to have a change (S201). If only one interfering object is detected to have a change, the interfering object is specified as the notification target object. The light emission control unit 27 causes the light notification unit 7 to emit light in response to the relative condition of the interfering object specified as the notification target (S202).

Figure 9:
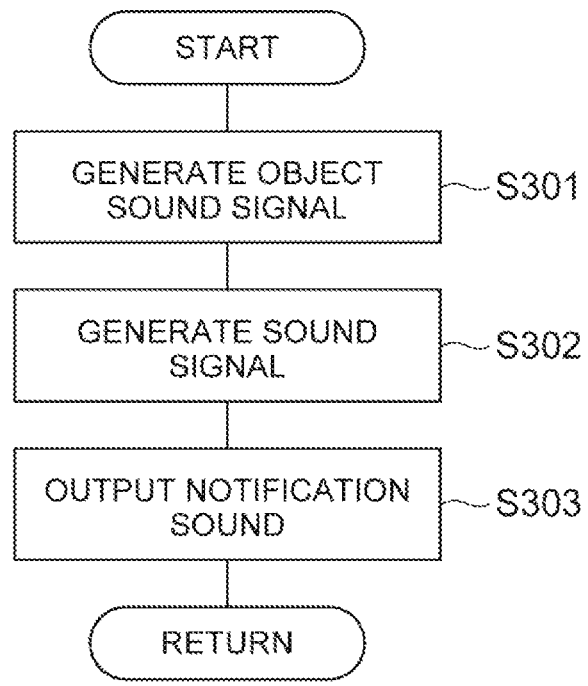
FIG. 9 is a flowchart illustrating the flow of a notification process using auditory stimulation.

Subsequently, a detailed description will be given on the flow of S105 of FIG. 7 in the notification process using auditory stimulation. As illustrated in FIG. 9, the sound output control unit 26 generates an object sound signal for outputting a notification sound based on the set virtual sound source and the relative condition (S301). If a plurality of virtual sound sources are set, the sound output control unit 26 generates an object sound signal for each virtual sound source. The sound output control unit 26 generates a sound signal for controlling the sound output unit 6 based on the object sound signal (S302). If only one virtual sound source is set, the sound output control unit 26 uses the generated object sound signal as a sound signal. If the plurality of the virtual sound sources are set, the sound output control unit 26 generates a sound signal by synthesizing a plurality of the object sound signals generated for the virtual sound sources. The sound output control unit 26 outputs a notification sound from the sound output unit 6 by inputting the generated sound signal into the sound output unit 6 (S303).

As described above, the notification device 100 sets a virtual sound source around the driver based on the detected position of the object, and outputs a notification sound such that the driver identifies that the notification sound has come from the virtual sound source. Therefore, the driver is capable of identifying the presence direction of the object based on the direction from which the notification sound is coming. In addition, the notification device 100 outputs a notification sound in response to the relative condition. Therefore, the driver is capable of identifying the relative condition based on the notification sound. As described above, the notification device 100 is capable of notifying the position-based information and the relative condition of the object, using a notification sound. As a result, the notification device 100 is capable of properly notifying the driver about information of objects around the host vehicle V.

The sound output control unit 26 outputs a notification sound for an object that is determined to have a potential for interfering with the host vehicle V by the interference determination unit 23, and does not output a notification sound for an object that is determined to have no potential for interference. In this case, the notification device 100 is capable of not performing notification for the object with low needs for notification due to having no potential for interfering with the host vehicle V, and is capable of performing notification only for the object with high needs for notification due to having a potential for interfering with the host vehicle V.

The notification device 100 includes the sound output unit 6 and the light notification unit 7. Therefore, the notification device 100 is capable of notifying the driver about information of objects around the host vehicle V, using a notification sound output from the sound output unit 6 and light emitted from the light notification unit 7. In addition, even though light emitted from the light notification unit 7, or the like draws driver's attention, the notification device 100 is capable of drawing driver's attention also to an object for which notification using a notification sound is performed.

(Various Specific Examples of Notification)

Herein, the virtual sound source setting unit 25 of the first embodiment sets a virtual sound source at the position of an interfering object in which a change is detected. Various methods for setting a virtual sound source can be adopted dependent on anticipated effects of notification using a notification sound. Hereinbelow, a description will be given on various specific examples of notification using a notification sound, and the methods for setting a virtual sound source.

Figure 10:
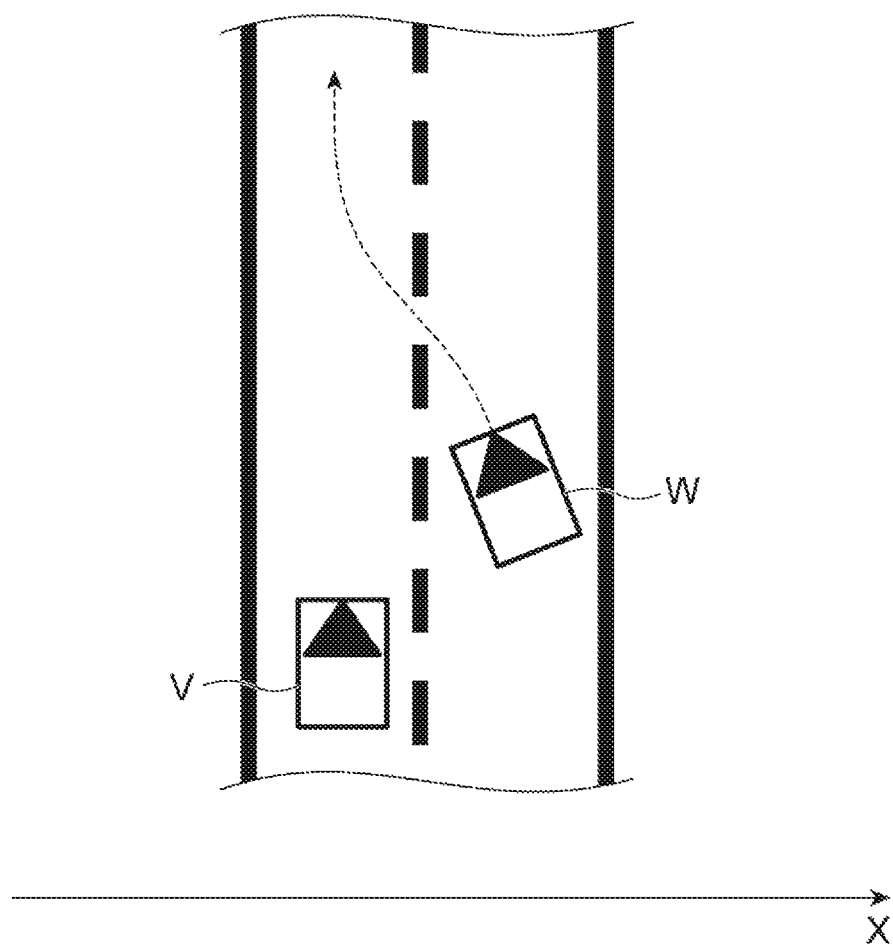
FIG. 10 is a plan view of surroundings of the host vehicle illustrating an example of external situation of the host vehicle.

The notification device 100 is capable of (a) notifying a driver about information of an interfering object or the like and (b) guiding driver's attention to a monitoring object, using a notification sound. Hereinbelow, (a) and (b) will be specifically described using a scene illustrated in FIG. 10. FIG. 10 illustrates a scene where an other vehicle W (interfering object) traveling in an adjacent lane overtakes the host vehicle V and enters a travel lane of the host vehicle V.

(a) Notify the driver about information of an interfering object or the like

Figure 11:
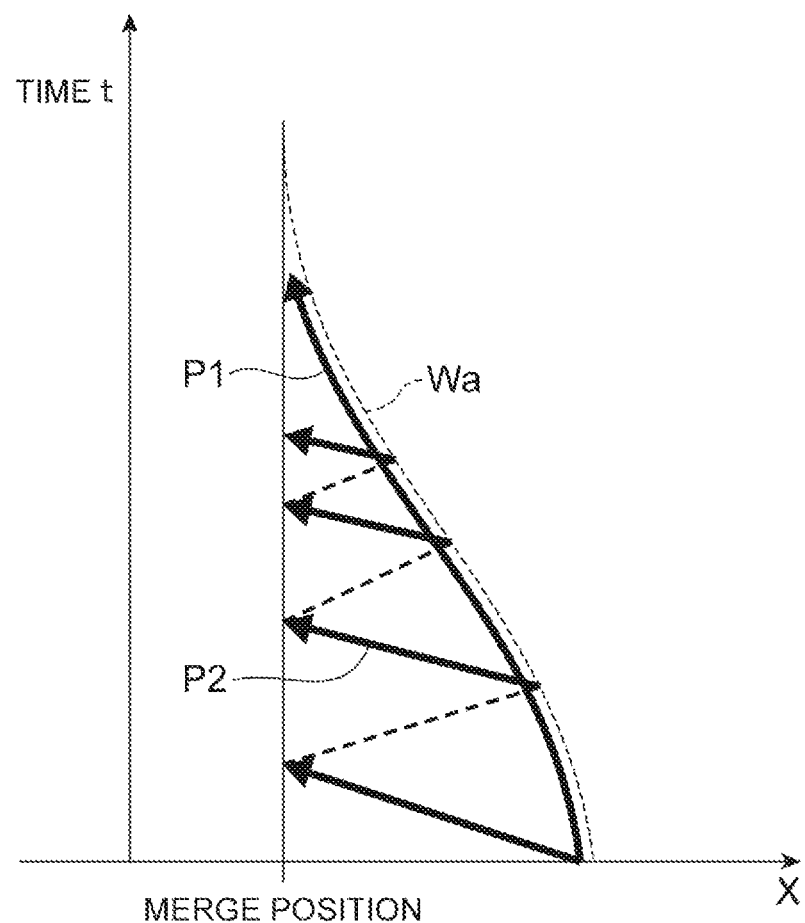
FIG. 11 is a graph illustrating an example of movement of a virtual sound source when the position of the other vehicle is being notified.

As a method for notifying the driver about information of an interfering object or the like, for example, as described in the first embodiment, the position (direction) of a virtual sound source is adjusted to coincide with the position (direction) of the other vehicle W. In FIG. 11, a position Wa of the other vehicle W is illustrated over time by the dotted line. The position Wa of the other vehicle W is the position over time when the other vehicle W travels as illustrated in FIG. 10. In FIGS. 10 and 11, the x-axis is a lane width direction of a road on which the host vehicle V travels. Namely, the position Wa of the other vehicle W illustrated in FIG. 11 is the changing position of the other vehicle W in the lane width direction. In addition, in FIG. 11, a merge position is a position (predicted position) in an x-axis direction when the other vehicle W merges onto the travel lane of the host vehicle V. In this case, for example, according to a change in the position Wa of the other vehicle W, the virtual sound source setting unit 25 moves the virtual sound source as shown by a movement P1 of the virtual sound source illustrated by the arrow head in FIG. 11. The notification device 100 is capable of notifying the position of the other vehicle W using the notification sound by performing notification based on the virtual sound source set in this manner.

In addition, as another method, a path of the other vehicle W is predicted, and the virtual sound source is moved from a present position (direction) of the other vehicle W toward a future predicted position (predicted direction) of the other vehicle W. The future predicted position of the other vehicle W can be predicted, for example, based on a change in the position of the other vehicle W detected by the object detection unit 21. In this case, for example, the virtual sound source setting unit 25 moves the virtual sound source from the present position of the other vehicle W toward the future predicted position of the other vehicle W as shown by a movement P2 of the virtual sound source illustrated by the arrow head in FIG. 11. In the example illustrated in FIG. 11, the future predicted position of the other vehicle W is a position (merge position) where the other vehicle W merges onto the travel lane of the host vehicle V. In this case, the movement speed of the virtual sound source toward the predicted position (predicted direction) of the other vehicle W is greater than an actual movement speed of the other vehicle W. In addition, while the other vehicle W moves to the travel lane of the host vehicle V, the virtual sound source setting unit 25 may move the virtual sound source several times as shown by the movement P2 of the virtual sound source illustrated in FIG. 11, or only at one time. The notification device 100 is capable of notifying the predicted position of the other vehicle W using the notification sound by performing notification based on the virtual sound source set in this manner.

As described above, (a) even in either of the methods for notifying the driver about the information of the interfering object and the like, when seen from the driver of the host vehicle V, the position (direction) of the virtual sound source coincides with the current or future presence position (direction) of the other vehicle W.

(b) Guiding driver's attention to a monitoring object

Figure 12:
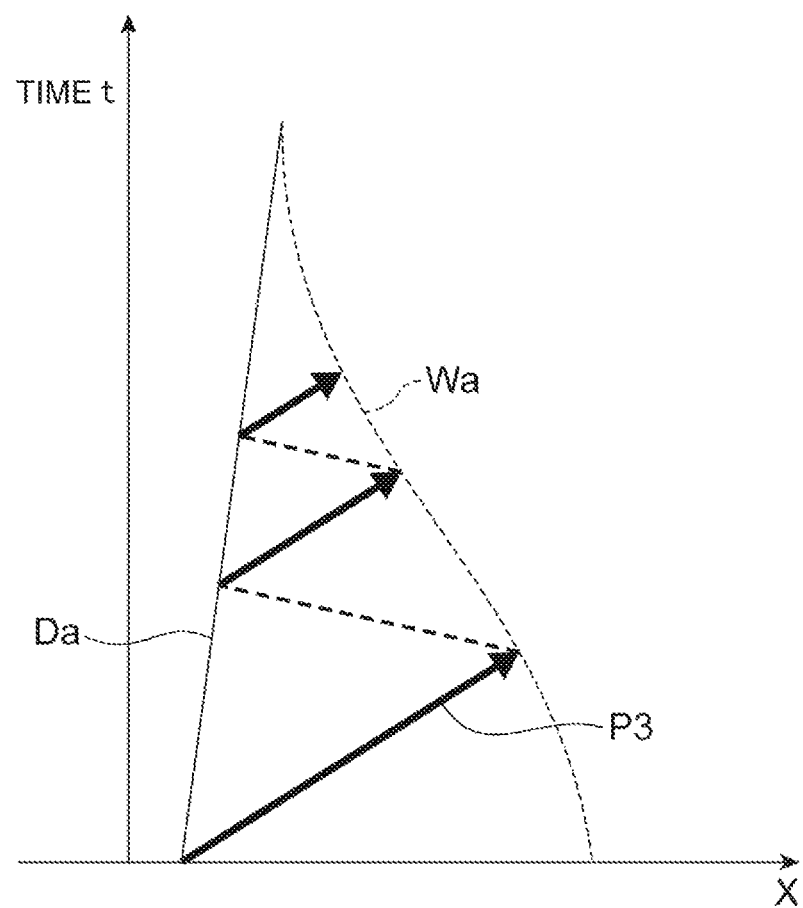
FIG. 12 is a graph illustrating an example of movement of a virtual sound source for guiding a driver's line of sight to a monitoring object.

The notification device 100 guides driver's attention to a monitoring object, specifically, guides a driver's line of sight to the monitoring object. As a method for guiding the driver's line of sight to the monitoring target, for example, the virtual sound source is moved from the driver's line of sight direction at this point of time serving as a start point to the position of the other vehicle W serving as an end point. In FIG. 12, a line of sight direction Da of the driver is illustrated over time by the solid line. In this case, the virtual sound source setting unit 25 moves the virtual sound source from the line of sight direction Da at the point of time toward the position Wa of the other vehicle as shown by a movement P3 of the virtual sound source illustrated by the arrow head in FIG. 12. In addition, until the driver's line of sight direction coincides with the direction of the other vehicle W, the virtual sound source setting unit 25 may move the virtual sound source several times as shown by the movement P3 of the virtual sound source illustrated in FIG. 12, or only at one time. In addition, the driver's line of sight direction at the point of time may be, for example, a direction obtained by measurement using an in-vehicle camera for capturing images of the driver or the like, or may be a predetermined direction (for example, assuming that the driver points to the front). The notification device 100 is capable of drawing driver's attention to the other vehicle W using the notification sound by performing notification based on the virtual sound source set in this manner.

(Specific Examples of Notification Scene)

Subsequently, a description will be given on specific scenes when the notification device 100 performs notification using a notification sound. The scenes that the notification device 100 performs notification using a notification sound are categorized into the following three types of scenes, dependent on the type of a nearby interfering object, movements of the host vehicle V and the other vehicle, and the like.

(Scene 1) When a nearby interfering object in motion interferes with the host vehicle V (for example, the other vehicle makes a lane change)

(Scene 2) When a nearby stationary interfering object interferes with the host vehicle V (Scene 3) When the host vehicle V interferes with a nearby object (for example, the host vehicle V makes a lane change)

Hereinbelow, a description will be given on specific examples of notification using a notification sound, such as (a) notifying the driver about information of an interfering object or the like and (b) guiding driver's attention to a monitoring object, in each of (Scene 1) to (Scene 3). Hereinbelow, a virtual sound source is exemplarily moved, and the virtual sound source may be moved in manners other than manners exemplified hereinbelow.

(Scene 1) When a nearby interfering object in motion interferes with the host vehicle V Firstly, a description will be given on specific examples of notification, such as (a) notifying the driver about information of an interfering object or the like, in (Scene 1). Various scenes can be assumed as Scene 1 that the nearby interfering object in motion interferes with the host vehicle V. Hereinbelow, a description will be given on specific examples of notification, such as (a) notifying the driver about information of an interfering object or the like, in various scenes assumed as Scene 1.

(Scene 1-1-*a*) When a parallel traveling vehicle makes a trajectory change

As an example of Scene 1, as illustrated in FIG. 10, the other vehicle W (interfering object) traveling parallel to the host vehicle V makes a trajectory change to cut in ahead of the host vehicle V (the other vehicle W cuts in from the left side). In this case, the virtual sound source setting unit 25 notifies the driver of the host vehicle V about the position of the other vehicle W by moving the virtual sound source conforming to the movement of the other vehicle W (from left to right). Examples of a method for realizing the notification include a method for presenting an actual movement of the other vehicle W and a method for predicting and presenting a movement of the other vehicle W.

The method for presenting the actual movement of the other vehicle W is a method for delivering the position of the other vehicle W. In the method for presenting the actual movement of the other vehicle W, according to a change in the position Wa of the other vehicle W, the virtual sound source setting unit 25 moves the virtual sound source as shown by the movement P1 of the virtual sound source illustrated in FIG. 11. In addition, the method for predicting and presenting the movement of the other vehicle W is a method for delivering a future predicted position. In the method for predicting and presenting the movement of the other vehicle W, the position of the virtual sound source (sound) differs from the position of the other vehicle W. In the method for predicting and presenting the movement of the other vehicle W, the virtual sound source setting unit 25 moves the virtual sound source toward the predicted position of the other vehicle W as shown by the movement P2 of the virtual sound source illustrated in FIG. 1.

(Scene 1-2-*a*) When the other vehicle merges

Figure 13:
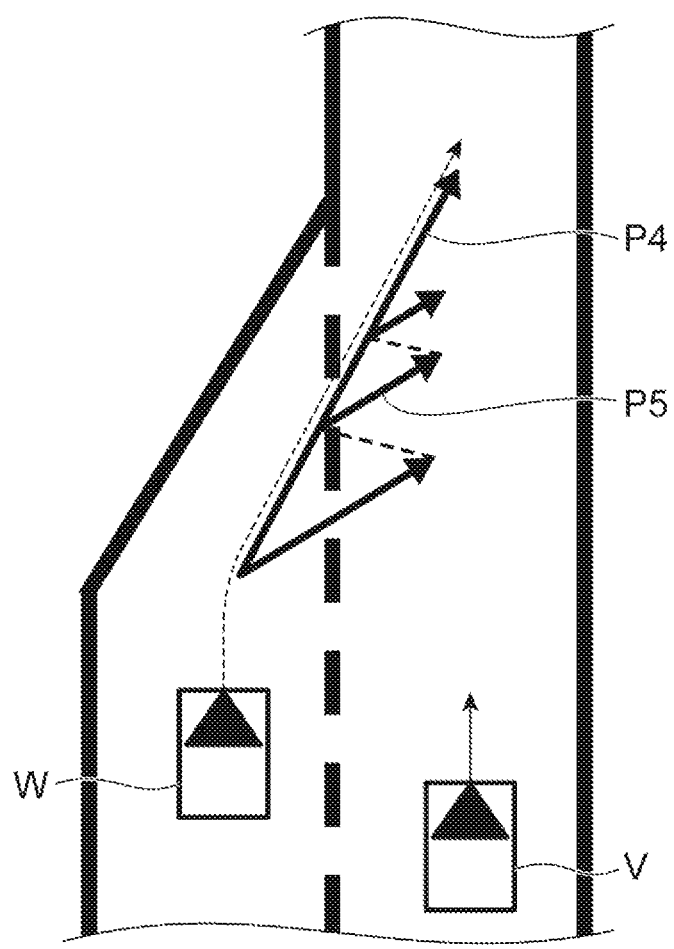
FIG. 13 is a plan view of surroundings of the host vehicle illustrating an example of movement of a virtual sound source when the other vehicle merges.

As an example of Scene 1, as illustrated in FIG. 13, the other vehicle W (interfering object) traveling parallel to the host vehicle V merges onto the travel lane of the host vehicle V. In this case, the virtual sound source setting unit 25 notifies the driver about a predicted trajectory of the other vehicle W by moving the virtual sound source along a predicted path Wb of the other vehicle W. Examples of a method for realizing the notification include, similar to "(Scene 1-1-*a*) When a parallel traveling vehicle makes a trajectory change", a method for presenting an actual movement of the other vehicle W and a method for predicting and presenting a movement of the other vehicle W. In the method for presenting the actual movement of the other vehicle W, according to a change in the position of the other vehicle W, the virtual sound source setting unit 25 moves the virtual sound source as shown by a movement P4 of the virtual sound source illustrated in FIG. 13. In the method for predicting and presenting the movement of the other vehicle W, the virtual sound source setting unit 25 moves the virtual sound source toward the predicted position of the other vehicle W as shown by a movement P5 of the virtual sound source.

Figure 14:
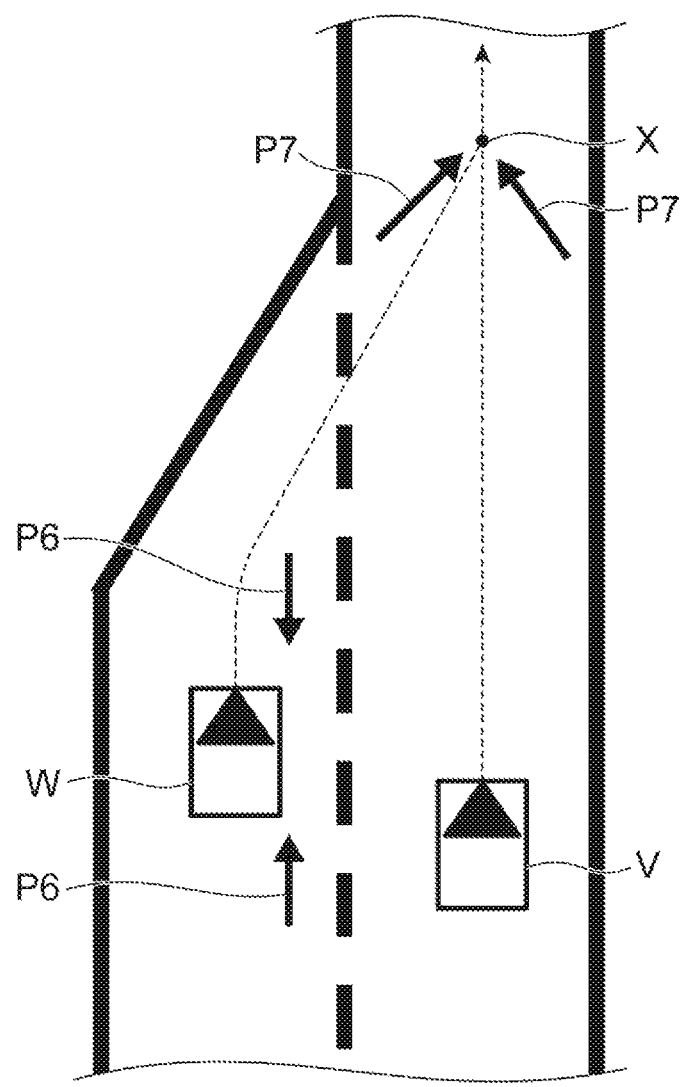
FIG. 14 is a plan view of surroundings of the host vehicle illustrating an example of movement of a virtual sound source when the other vehicle merges.

As another example, as shown by a movement P6 of the virtual sound sources illustrated in FIG. 14, the virtual sound source setting unit 25 moves a plurality of virtual sound sources such that the plurality of virtual sound sources converge onto the other vehicle W. In addition, as shown by a movement P7 of the virtual sound sources illustrated in FIG. 14, the virtual sound source setting unit 25 moves a plurality of virtual sound sources such that the plurality of virtual sound sources converge onto a merge location X (predicted merge location). Therefore, the notification device 100 is capable of notifying the driver of the host vehicle V about the position of the other vehicle W or the merge location X, using the notification sound.

(Scene 1-3-*a*) When the host vehicle V approaches the other vehicle ahead

As an example of Scene 1, the host vehicle V approaches the other vehicle (interfering object) ahead. In this case, the virtual sound source setting unit 25 brings a virtual sound source from a remote forward position to a nearby position. In addition, in this case, for example, the sound output control unit 26 outputs a notification sound such that the driver identifies that the notification sound has come from the position of the set virtual sound source, using the sound field synthesis method or the method using the head-related transfer function. Therefore, the notification device 100 is capable of notifying that the host vehicle V approaches the other vehicle ahead.

(Scene 1-4-*a*) When the other vehicle ahead drives away

As an example of Scene 1, the other vehicle (interfering object) stopping ahead of the host vehicle V drives away. In this case, the virtual sound source setting unit 25 takes a virtual sound source away from a nearby position to a remote position. In this case, for example, the sound output control unit 26 outputs a notification sound such that the driver identifies that the notification sound has come from the position of the set virtual sound source, using the sound field synthesis method or the method using the head-related transfer function. Therefore, the notification device 100 is capable of notifying that the position of the host vehicle V ahead is changed (driveaway).

When the notification sound is output in (Scene 1-1-*a*) to (Scene 1-4-*a*), the interference determination unit 23 may determine that the interfering object is in normal state (there is no change). In this case, the sound output control unit 26 may improve the sense of using the notification by the notification sound, or decrease the attention level of the driver by decreasing the sound volume, frequency, or tempo of the notification sound. Therefore, the notification device 100 is capable of easily directing driver's attention to an interfering object (obstacle) to which more attention needs to be paid. When the sound output control unit 26 outputs a notification sound using the sound field synthesis method or the method using the head-related transfer function, the sound output control unit 26 is capable of providing the same effects by keeping the position of the virtual sound source set by the virtual sound source setting unit 25, and decreasing any one of the sound volume, frequency, and tempo of the notification sound emitted from the virtual sound source.

Subsequently, a description will be given on specific examples of notification, such as (b) guiding driver's attention to a monitoring object, in (Scene 1). Hereinbelow, a description will be given on specific examples of notification, such as (b) guiding driver's attention to a monitoring object, in various scenes assumed as Scene 1.

(Scene 1-1-b) When a parallel traveling vehicle makes a trajectory change

As an example of Scene 1, as illustrated in FIG. 10, the other vehicle W (interfering object) traveling parallel to the host vehicle V makes a trajectory change to cut in ahead of the host vehicle V. In this case, the virtual sound source setting unit 25 moves the virtual sound source from the line of sight direction Da of the driver of the host vehicle V toward the position Wa of the other vehicle as shown by the movement P3 of the virtual sound source illustrated by the arrow head in FIG. 12. The notification device 100 is capable of drawing attention of the driver of the host vehicle V to the position of the other vehicle W traveling parallel thereto, by moving the virtual sound source in this manner.

(Scene 1-2-b) When the other vehicle merges

Figure 15:
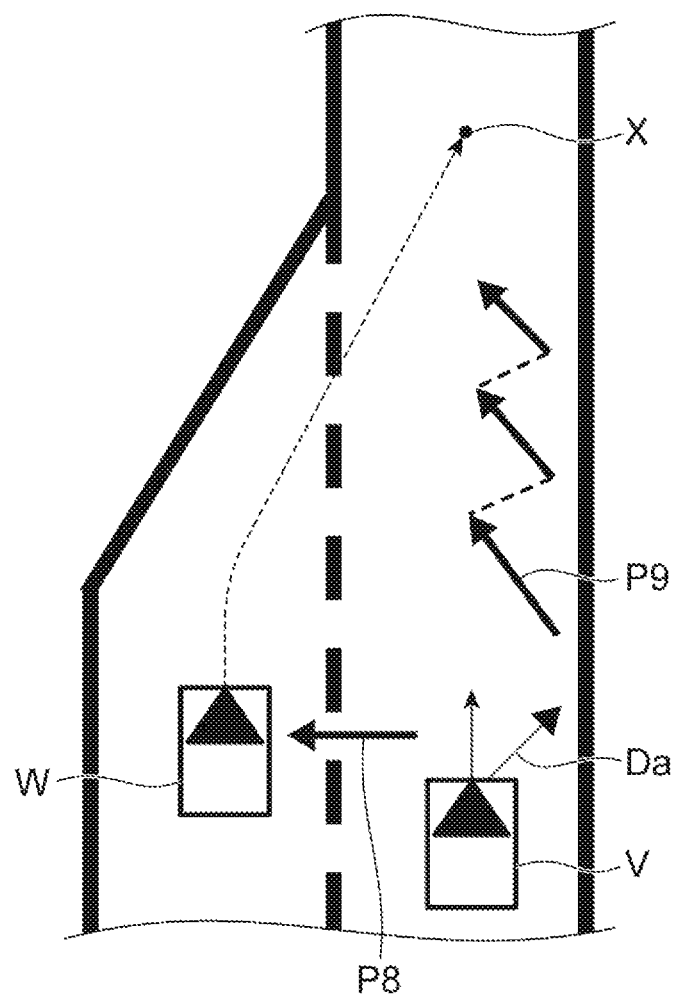
FIG. 15 is a plan view of surroundings of the host vehicle illustrating an example of movement of a virtual sound source when the other vehicle merges.

As an example of Scene 1, as illustrated in FIG. 15, the other vehicle W (interfering object) traveling parallel to the host vehicle V merges onto the travel lane of the host vehicle V. In this case, the virtual sound source setting unit 25 moves the virtual sound source from the line of sight direction Da at the point of time toward the other vehicle W as shown by a movement P8 of the virtual sound source. In addition, the virtual sound source setting unit 25 moves the virtual sound source from the line of sight direction Da at the point of time toward the merge location X of the other vehicle W as shown by a movement P9 of the virtual sound source. Until the driver's line of sight direction coincides with the direction of the other vehicle W or the direction of the merge location X, the virtual sound source setting unit 25 may move the virtual sound source several times or only at one time. The notification device 100 is capable of drawing driver's attention to the other vehicle W or the merge location X by moving the virtual sound source in this manner.

As the distance between the host vehicle V and the merging other vehicle W becomes short, the sound output control unit 26 may draw more attention of the driver of the host vehicle V by increasing the sound volume, frequency, or tempo.

Figure 16:
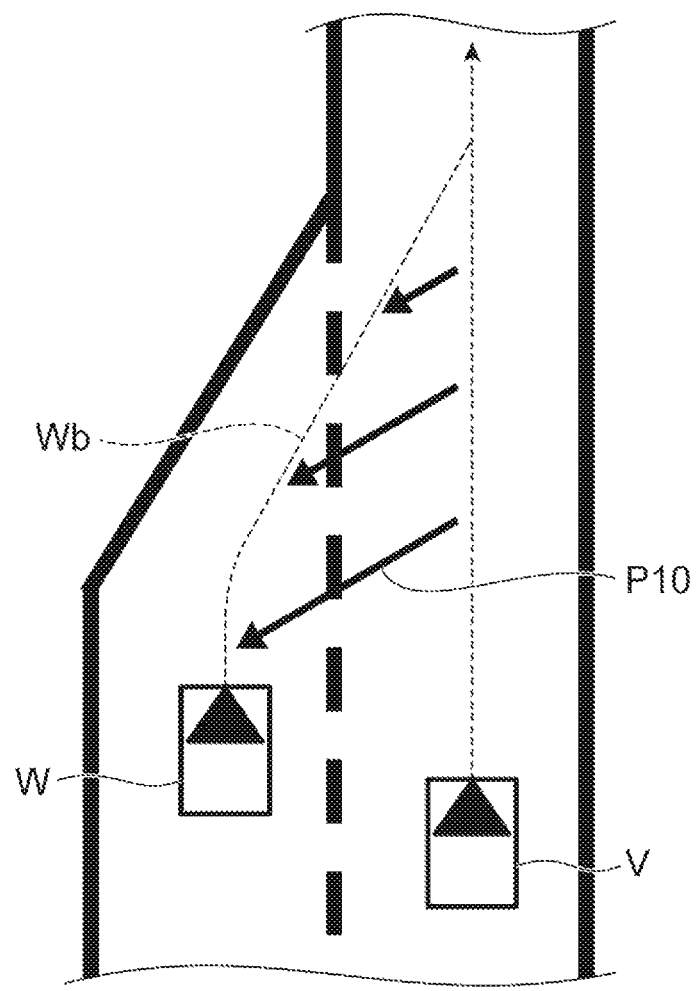
FIG. 16 is a plan view of surroundings of the host vehicle illustrating an example of movement of a virtual sound source when the other vehicle merges.

In addition, the virtual sound source setting unit 25 may move the virtual sound source from the line of sight direction of the driver of the host vehicle V toward the predicted path Wb of the other vehicle W as shown by a movement P10 of the virtual sound source illustrated in FIG. 16. Therefore, the notification device 100 is capable of directing driver's attention to the merging other vehicle W. The sound output control unit 26 may draw driver's attention to the merge direction by increasing or decreasing the merging-side sound volume of the moving virtual sound source. In addition, similar to (Scene 1-1-a) to (Scene 1-4-a), if the interference determination unit 23 determines that the interfering object is in normal state (there is no change), the sound output control unit 26 may decrease the sound volume, frequency, or tempo of the notification sound.

(Scene 1-3-b) When the host vehicle V approaches the other vehicle ahead

As an example of Scene 1, the host vehicle V approaches the other vehicle (interfering object) ahead. In this case, the virtual sound source setting unit 25 brings a virtual sound source from a remote forward position to a nearby position. Alternatively, the virtual sound source setting unit 25 moves the virtual sound source remote from the driver's line of sight direction toward the direction of the other vehicle. Therefore, the notification device 100 is capable of directing attention of the driver of the host vehicle V forward.

In addition, when the host vehicle V approaches the other vehicle ahead, the sound output control unit 26 may call attention of the driver of the host vehicle V by increasing or decreasing the sound volume or frequency of the notification sound.

(Scene 1-4-b) When the other vehicle ahead drives away

As an example of Scene 1, the other vehicle (interfering object) stopping ahead of the host vehicle V drives away. In this case, the virtual sound source setting unit 25 brings a virtual sound source from a remote forward position to a nearby position. Alternatively, the virtual sound source setting unit 25 moves the virtual sound source from the driver's line of sight direction toward a position ahead of the host vehicle V. Therefore, the notification device 100 is capable of directing attention of the driver of the host vehicle V forward.

In addition, when the other vehicle stopping ahead of the host vehicle V drives away, the sound output control unit 26 may call attention of the driver of the host vehicle V or direct attention forward by increasing or decreasing the sound volume or frequency of the notification sound.

In (Scene 1-1-b) to (Scene 1-4-b), a plurality of interfering objects (obstacles) may be present. The case is, for example, as illustrated in FIG. 5, that a pedestrian is present on the roadside ahead, and the other vehicle ahead of the pedestrian cuts in. In this case, the sound output control unit 26 may increase or decrease the sound volume, frequency, or tempo of a virtual sound source corresponding to an interfering object close to the host vehicle V. Therefore, the notification device 100 is capable of directing driver's attention to the interfering object having a higher potential for imminent interference. In addition, the sound output control unit 26 is capable of preventing attentional blindness from causing the driver to forget about a remote interfering object by increasing or decreasing the sound volume, frequency, or tempo of a virtual sound source corresponding to an interfering object remote from the host vehicle V.

Figure 17:
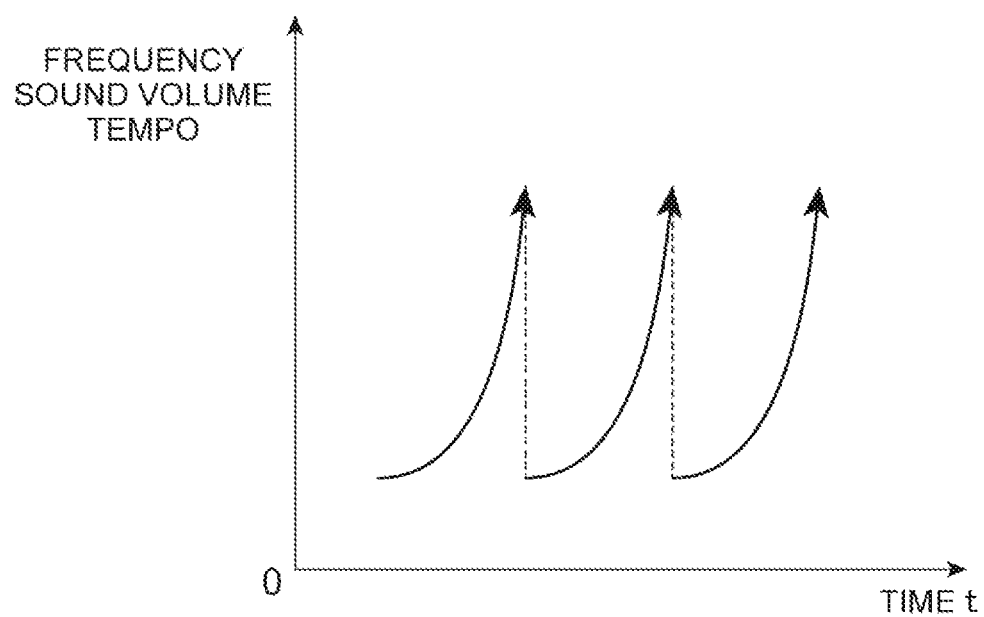
FIG. 17 is a graph illustrating an example of waveform of a sound volume or the like when a sound volume, frequency, or tempo is increased.
Figure 18:
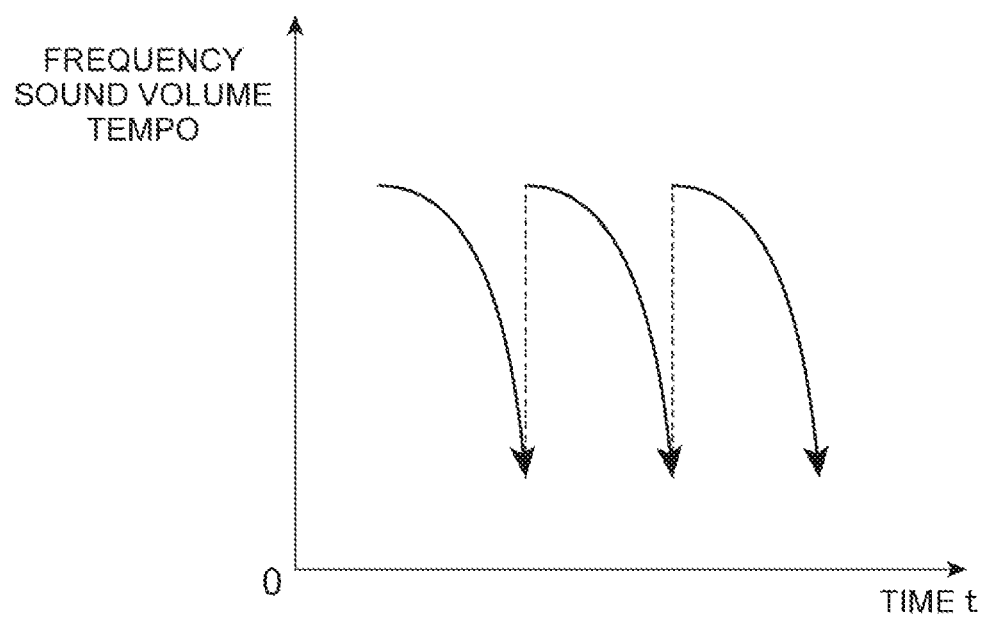
FIG. 18 is a graph illustrating an example of waveform of a sound volume or the like when a sound volume, frequency, or tempo is decreased.

When changing the sound volume, frequency, or tempo of the notification sound in (Scene 1), the sound output control unit 26 selects a proper waveform, for example, from waveforms of sound volume, frequency, or tempo illustrated in FIGS. 17 and 18, and changes the sound volume or the like of the notification sound. Therefore, the notification device 100 is capable of controlling the strength of the notification (the strength of delivery) using the notification sound.

(Scene 2) When a nearby stationary interfering object interferes with the host vehicle V Subsequently, specific examples of notification in (Scene 2) will be described. Also in Scene 2, the notification device 100 is capable of notifying information of a stationary obstacle using a notification sound by (a) the method for notifying the driver about information of an interfering object or the like. In addition, the notification device 100 is capable of guiding driver's attention to the stationary obstacle using a notification sound by (b) the method for guiding driver's attention to a monitoring object. In this case, the sound output control unit 26 may use separate tones, sound volumes, frequencies, or tempos of the notification sound for the interfering object in motion and the stationary interfering object. Therefore, the notification device 100 is capable of notifying the driver of the host vehicle V whether the interfering object is in motion or stationary.

Also in Scene 2, as described in Scene 1, the sound output control unit 26 may increase or decrease the sound volume, frequency, or tempo of the virtual sound source corresponding to the interfering object close to the host vehicle V. In addition, when the separate sound volumes, frequencies, or tempos of the notification sound are used for the interfering object in motion and the stationary interfering object, the sound output control unit 26 may select a proper waveform, for example, from the waveforms of sound volume, frequency, or tempo illustrated in FIGS. 17 and 18, and change the sound volume or the like of the notification sound. In addition, even with the tone, the sound output control unit 26 may select a proper tone from a predetermined tone for the interfering object in motion and a predetermined tone for the stationary interfering object in response to whether the interfering object is in motion or stationary, and output a notification sound.

(Scene 3) When the host vehicle V interferes with a nearby object For example, if the host vehicle V makes a lane change, the host vehicle V can be considered to interfere with the other vehicle or the like. For this reason, when the host vehicle V makes a lane change or the like, the notification device 100 may be able to notify whether or not the host vehicle V interferes with a nearby object. In order to realize the object, the notification device 100 is capable of notifying a movement of the host vehicle V using a notification sound. By notifying the movement of the host vehicle V, the notification device 100 is capable of notifying whether or not the host vehicle V interferes with the nearby object when the host vehicle V travels along the path of the notified movement, in addition to notifying the movement of the host vehicle V.

Figure 19:
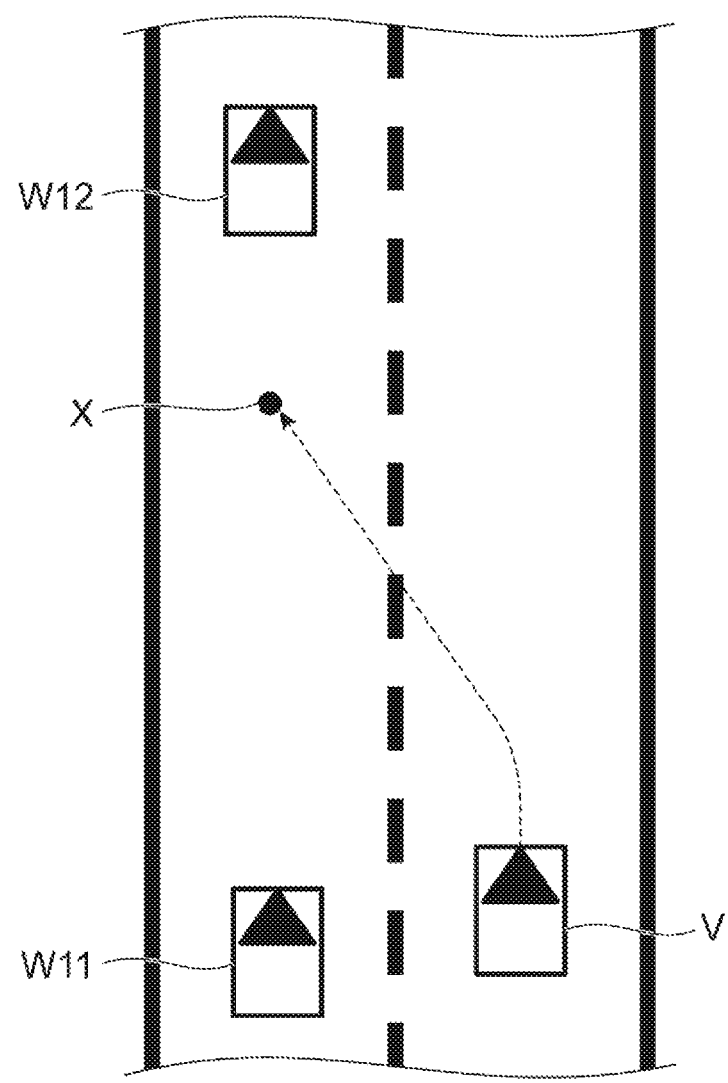
FIG. 19 is a plan view of surroundings of the host vehicle illustrating an example of external situation when the host vehicle makes a lane change to a left lane.

Herein, a description will be given on specific examples of notification in "(Scene 3) when the host vehicle V interferes with a nearby object", as illustrated in FIG. 19, when the host vehicle V makes a lane change to a left lane and enters the left lane. In the example illustrated in FIG. 19, the host vehicle V intends to cut in to the merge location X (predicted merge location) between the first other vehicle W11 and the second other vehicle W12 while making a lane change to the left lane.

Firstly, a description will be given on specific examples of notification, such as (a) notifying the driver about information of an interfering object or the like, in (Scene 3). Herein, as the information of the interfering object or the like, the notification device 100 notifies information of the merge location X when the host vehicle V makes a lane change.

(Scene 3-*a*) When the host vehicle makes a lane change to the left lane

Figure 20:
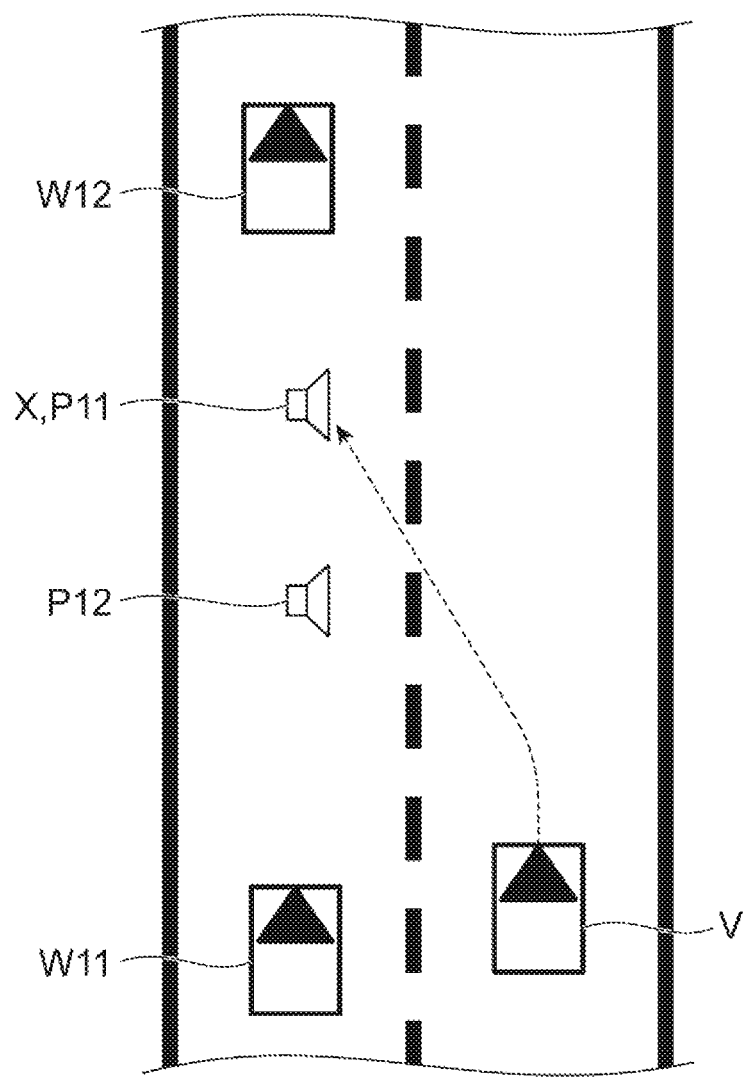
FIG. 20 is a plan view of surroundings of the host vehicle illustrating the position of a virtual sound source set when the host vehicle makes a lane change to the left lane.

When the host vehicle makes a lane change to the left lane, as illustrated in FIG. 20, the virtual sound source setting unit 25 sets a virtual sound source P11 at the merge location X, or sets a virtual sound source P12 at a position (leftward of the host vehicle V in the example) closer to the merge location X than to the host vehicle V. The sound output control unit 26 outputs a notification sound based on the set virtual sound source P11 or P12. In this case, the sound output control unit 26 may output a predetermined notification sound for notifying the merge location instead of the notification sound in response to a relative condition of the interfering object. Therefore, the notification device 100 is capable of notifying the driver of the host vehicle V about a location (the merge location X) where the host vehicle V merges in the left lane or about which lane the host vehicle V merges onto between right and left lanes (which lane the merge location X is present in).

In addition, as another method, the virtual sound source setting unit 25 may notify a merge location (which position the host vehicle V cuts in to) of the host vehicle V by notifying the driver about information of other vehicles traveling ahead of and behind the host vehicle V after the host vehicle V has made a lane change. Specifically, the virtual sound source setting unit 25 sets a virtual sound source for each of a first other vehicle W12 traveling ahead and a second other vehicle W11 traveling behind after the host vehicle V has merged, using various methods described above. The sound output control unit 26 may increase or decrease the sound volume, frequency, or tempo of the virtual sound source corresponding to the first other vehicle W12 or the second other vehicle W11. Therefore, the notification device 100 is capable of notifying the merge location of the host vehicle V by changing the sound volume or the like of the notification sound.

Figure 21:
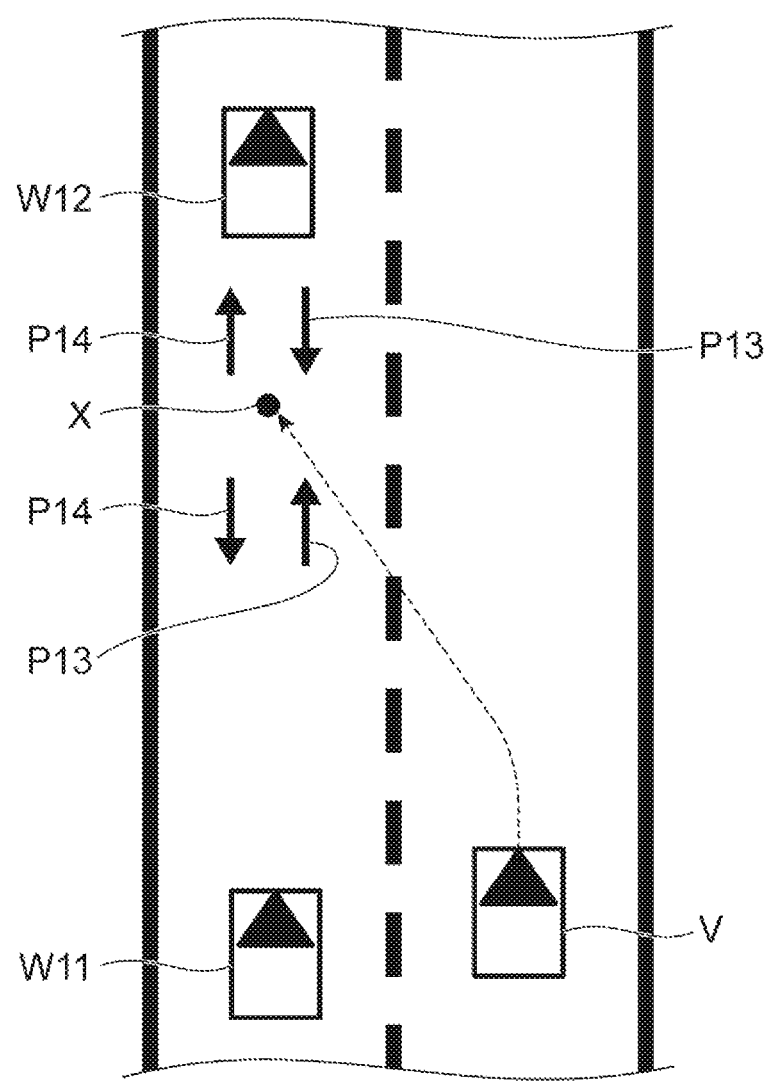
FIG. 21 is a plan view of surroundings of the host vehicle illustrating an example of movement of the virtual sound source when the host vehicle makes a lane change to the left lane.

As still another example, as illustrated in FIG. 21, the virtual sound source setting unit 25 sets virtual sound sources ahead of and behind the merge location X, and moves the set virtual sound sources as shown by a movement P13 or P14 of the virtual sound sources illustrated by the arrow heads. Specifically, the virtual sound source setting unit 25 causes the virtual sound sources, which are set ahead of and behind the merge location X, to converge onto the merge location X as shown by the movement P13 of the virtual sound sources, or the virtual sound sources, which are set ahead of and behind the merge location X, to diverge from the merge location X as shown by the movement P14 of the virtual sound sources. In this case, the sound output control unit 26 may output the predetermined notification sound for notifying the merge location instead of the notification sound in response to a relative condition of the interfering object. The notification device 100 is capable of notifying the position of the merge location X using a notification sound by performing notification based on the virtual sound sources set in this manner.

As still another example, the virtual sound source setting unit 25 may set virtual sound sources ahead of and behind the merge location X, and increase or decrease the sound volume, frequency, or tempo of the set virtual sound sources. Therefore, the notification device 100 is capable of notifying the merge location of the host vehicle V by changing the sound volume or the like of the notification sound.

Subsequently, a description will be given on specific examples of notification, such as (b) guiding driver's attention to a monitoring object, in (Scene 3). Herein, the notification device 100 guides driver's attention to the merge location X when the host vehicle V makes a lane change.

(Scene 3-*b*) When the host vehicle makes a lane change to the left lane

For example, if a notification sound is output based on a virtual sound source set around the host vehicle V, the sound output control unit 26 increases or decreases the sound volume of the notification sound output from the sound output unit 6 which is provided on a merging side with respect to the driver of the host vehicle V. As described above, the notification device 100 is capable of directing driver's attention to the merge direction by increasing or decreasing the sound volume of the notification sound output from the sound output unit 6 on the merging side.

Figure 22:
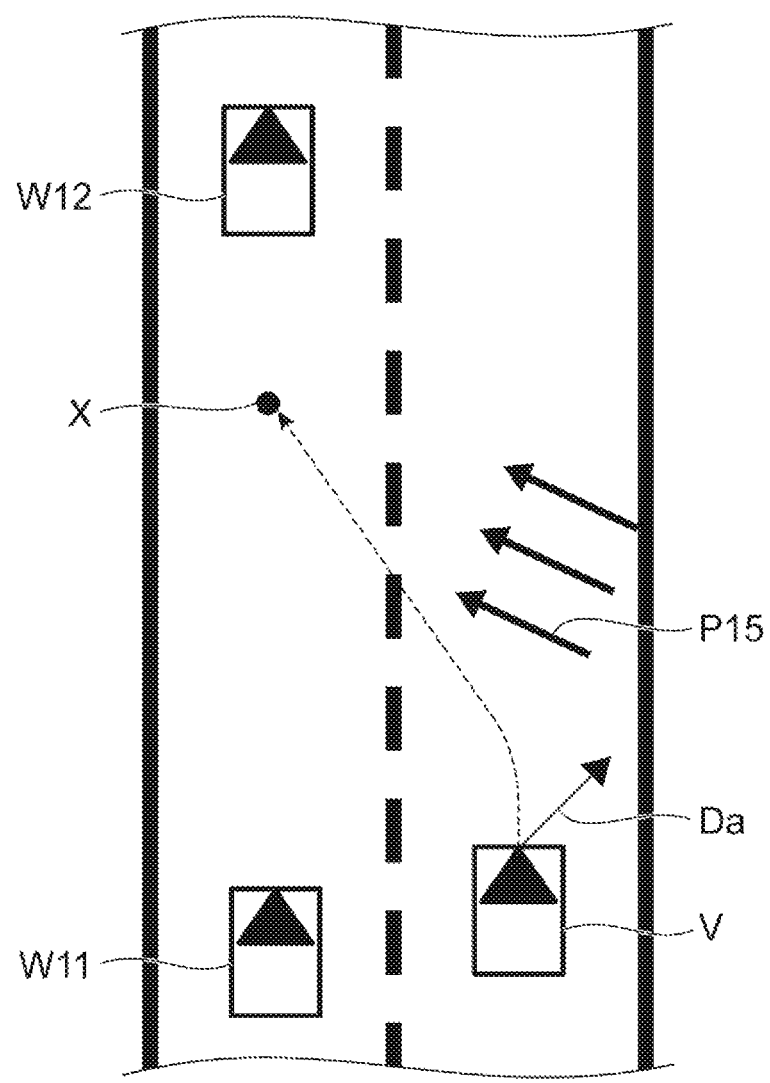
FIG. 22 is a plan view of surroundings of the host vehicle illustrating an example of movement of the virtual sound source for guiding the driver's line of sight to a monitoring object when the host vehicle makes a lane change to the left lane.

As another example, the virtual sound source setting unit 25 moves the virtual sound source from the line of sight direction Da of the driver of the host vehicle V toward the merge location X as shown by a movement P15 of the virtual sound source illustrated in FIG. 22. The notification device 100 is capable of directing driver's attention to the merge location X by outputting a notification sound based on the virtual sound source set in this manner.

Also in Scene 3, when separate sound volumes, frequencies, or tempos of the notification sound are used, the sound output control unit 26 selects a proper waveform, for example, from the waveforms of sound volume, frequency, or tempo illustrated in FIGS. 17 and 18, and changes the sound volume or the like of the notification sound.

Second Embodiment

Subsequently, a second embodiment will be described. In the following description, the same reference signs will be assigned to the same configuration elements as those of the notification device 100 of the first embodiment, and detailed descriptions of the same configuration elements will be omitted. Hereinbelow, mainly the difference between the first embodiment and the second embodiment will be described.

Figure 23:
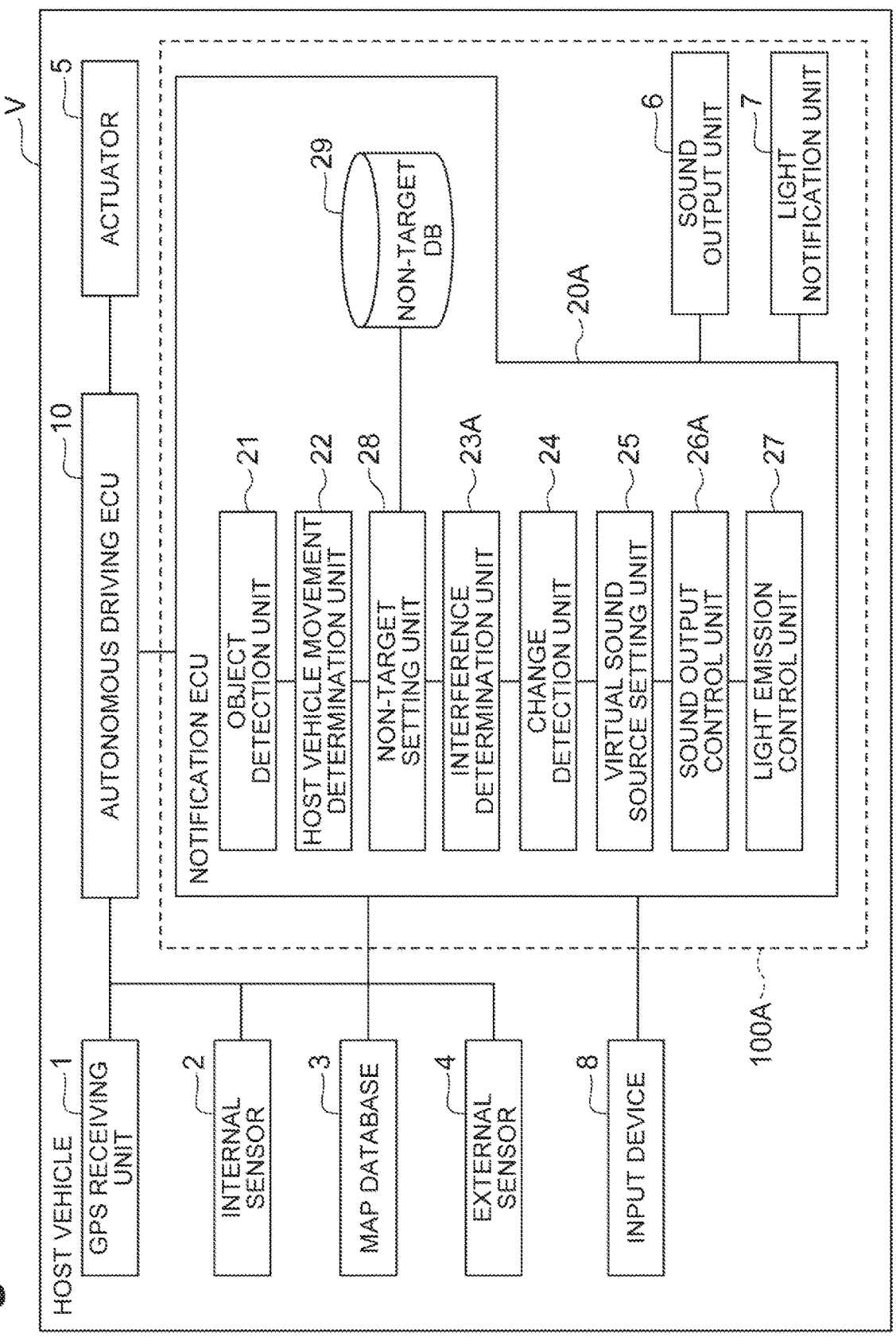
FIG. 23 is an example of functional block diagram of the vehicle including a notification device of a second embodiment.

As illustrated in FIG. 23, based on an operation performed by a driver, a notification device 100A of the second embodiment stops a notification using a notification sound for an interfering object for which notification using a notification sound has been performed. For example, the notification device 100 of the first embodiment may falsely determine an object not interfering with the host vehicle V, as an interfering object, and perform notification for the object. Specifically, for example, the notification device 100 may falsely identify poles for separating roads from each other, a doll installed on a roadside, or the like as a pedestrian or vehicle, and falsely determine the poles, the doll, or the like as an interfering object. Even though having falsely determined an object as an interfering object, the notification device 100A of the present embodiment is capable of stopping a notification based on an operation performed by the driver.

Specifically, in addition to the GPS receiving unit 1 and the like of the first embodiment, an input device 8 is further provided in the host vehicle V installed with the notification device 100A. The input device 8 is a device that receives an input operation for stopping a notification performed by the driver (occupant) of the host vehicle V. Herein, the driver of the host vehicle V hears a notification sound, and confirms a notification target object. If the driver determines that no notification is needed (non-interfering object), the driver inputs an instruction, indicative of no notification being needed, into the notification device 100A by operating the input device 8. The input device 8 may be, for example, a push-button type switch.

The notification device 100A includes the sound output unit 6; the light notification unit 7; and a notification ECU 20A. Similar to the notification ECU 20 of the first embodiment, the notification ECU 20A is an electronic control unit having a CPU, a ROM, a RAM, a CAN communication circuit, and the like.

The notification ECU 20A functionally includes the object detection unit 21; the host vehicle movement determination unit 22; a non-target setting unit 28; an interference determination unit 23A; the change detection unit 24; the virtual sound source setting unit 25; a sound output control unit 26A; the light emission control unit 27; and a non-target database (non-target DB) 29.

The non-target setting unit 28 sets an object for which notification using a notification sound is not performed, based on an input operation on the input device 8 performed by the driver. Specifically, for example, the non-target setting unit 28 acquires an object ID of an interfering object for which notification using a notification sound is performed, from the sound output control unit 26A. If the driver inputs an instruction for stopping a notification into the input device 8, the non-target setting unit 28 assigns an unneeded-notification signal, indicative of no notification being needed, to the object ID of the interfering object acquired from the sound output control unit 26A. As described above, the non-target setting unit 28 sets the object for which notification using a notification sound is not performed, by assigning the unneeded-notification signal to the object ID. At that time, the light emission control unit 27 may deliver which interfering object is selected as a target for which a notification is to be stopped, to the driver by displaying the interfering object, which is selected as a target for which a notification is to be stopped, in a highlighted manner on the light notification unit 7 which is a display.

The input device 8 may be a switch such as a joystick capable of receiving also a direction input, instead of the push-button type switch. In this case, for example, when the sound output control unit 26A performs notification using a notification sound for a plurality of interfering objects, based on direction information input into the input device 8 such as joystick, the non-target setting unit 28 may specify an interfering object (object ID) for which a notification is to be stopped. At that time, for example, the light emission control unit 27 may assist the driver in selecting a target for which a notification is to be stopped, by displaying the plurality of interfering objects, for which notifications are to be stopped, in a highlighted manner on the light notification unit 7 which is a display.

After being assigned to the object ID by the non-target setting unit 28, the unneeded-notification signal is taken over and used by the interference determination unit 23A, the change detection unit 24, the virtual sound source setting unit 25, and the sound output control unit 26A other than the non-target setting unit 28.

Namely, after the interference determination unit 23A determines whether or not interference is generated by the object corresponding to the object ID to which an unneeded-notification signal is assigned, the interference determination unit 23A assigns an unneeded-notification signal to the object ID, and sends the object ID and the unneeded-notification signal together with an interference determination result, to the change detection unit 24. However, if an unneeded-notification signal is assigned to an object ID, the interference determination unit 23A may assign an unneeded-notification signal to the object ID, and send the object ID with the unneeded-notification signal to the change detection unit 24 without determining whether or not interference is generated by an object to which the object ID is assigned. In addition, after the change detection unit 24 detects whether or not there is a change in the interfering object corresponding to the object ID to which an unneeded-notification signal is assigned, the change detection unit 24 assigns an unneeded-notification signal to the object ID and sends the object ID and the unneeded-notification signal together with a detection result, to the virtual sound source setting unit 25. However, if an unneeded-notification signal is assigned to an object ID, the change detection unit 24 may assign an unneeded-notification signal to the object ID, and send the object ID with the unneeded-notification signal to the virtual sound source setting unit 25 without detecting whether or not there is a change in an interfering object to which the object ID is assigned.

In addition, after the virtual sound source setting unit 25 sets a virtual sound source for the interfering object corresponding to the object ID to which an unneeded-notification signal is assigned, the virtual sound source setting unit 25 assigns an unneeded-notification signal to the object ID, and sends the object ID and the unneeded-notification signal together with information of the set virtual sound source, to the sound output control unit 26A. However, if an unneeded-notification signal is assigned to an object ID, the virtual sound source setting unit 25 may assign an unneeded-notification signal to the object ID, and send the object ID with the unneeded-notification signal to the sound output control unit 26 without setting a virtual sound source for an interfering object to which the object ID is assigned.

In performing notification using a notification sound, the sound output control unit 26A does not output a notification sound for an object that is set as an object for which notification using a notification sound is not performed. Namely, if an unneeded-notification signal is assigned to an object ID of an interfering object which is a notification target, the sound output control unit 26A does not perform notification for the interfering object. Therefore, the notification device 100A is capable of stopping a notification for the interfering object on which notification is determined to not be needed by the driver, and is capable of performing notification, using the notification sound, only about the interfering object on which notification is determined to be needed. As a result, the notification device 100A is capable of prevents the notification sound from being unnecessarily output.

In addition, if an interfering object on which notification is determined to not be needed by the driver is normally present at the same location, the notification device 100A is capable of stopping a notification for the interfering object normally present. Therefore, the notification device 100A is capable of preventing from unnecessarily performing notification using a notification sound for the interfering object (for example, a doll installed on a roadside) normally present. Specifically, the notification device 100A stores the position (absolute coordinates) of the interfering object on which notification is determined to not be needed by the driver, and does not perform notification using a notification sound for an interfering object detected at the position.

Hereinbelow, an example of a process of stopping a notification for an interfering object normally present will be described in detail. The non-target database 29 stores absolute coordinates of an interfering object on which notification is determined to not be needed by the driver. The non-target setting unit 28 stores the absolute coordinates of the interfering object on which notification is determined to not be needed by the driver, in the non-target database 29. More specifically, the non-target setting unit 28 acquires an object ID, type information, a relative position, and a relative speed of a detected object from the object detection unit 21. In addition, the non-target setting unit 28 acquires a trajectory of the host vehicle V which contains the absolute coordinates and the orientation of the host vehicle V, from the host vehicle movement determination unit 22. The non-target setting unit 28 obtains the absolute coordinates of an interfering object which is input by the driver as an object for which no notification is needed, based on the information acquired from the object detection unit 21 and the host vehicle movement determination unit 22.

The non-target setting unit 28 stores the obtained absolute coordinates in the non-target database 29. In addition, when the non-target setting unit 28 stores absolute coordinates in the non-target database 29, if the absolute coordinates are not stored, the non-target setting unit 28 registers one for a confirmation counter associated with the absolute coordinates. On the other hands, when the non-target setting unit 28 stores absolute coordinates in the non-target database 29, if the absolute coordinates are already stored, the non-target setting unit 28 increases by one the value of a confirmation counter associated with the absolute coordinates. Therefore, whenever the driver inputs that no notification is needed for the object normally present, the value of a confirmation counter associated with the absolute coordinates of the object is increased.

The interference determination unit 23A acquires an object ID, type information, a relative position, and a relative speed of a detected object from the object detection unit 21. In addition, the interference determination unit 23A acquires a trajectory of the host vehicle V which contains the absolute coordinates and the orientation of the host vehicle V, from the host vehicle movement determination unit 22. The interference determination unit 23A calculates the absolute coordinates of an object designated by an object ID, based on the acquired information. The interference determination unit 23A determines whether or not the calculated absolute coordinates of the object are registered in the non-target database 29. If the calculated absolute coordinates of the object is registered in the non-target database 29, the interference determination unit 23A determines whether or not the value of a confirmation counter associated with the registered absolute coordinates is greater than a predetermined value.

If the value of the confirmation counter is greater than the predetermined value, the interference determination unit 23A assign an unneeded-notification signal to the object ID, and sends the object ID with the unneeded-notification signal to the change detection unit 24. Namely, even though the non-target setting unit 28 has not assigned an unneeded-notification signal to an object ID based on an input operation performed by the driver, the interference determination unit 23A assigns an unneeded-notification signal to the object ID based on the value of the confirmation counter.

If an unneeded-notification signal is assigned to an object ID of an interfering object which is a notification target, the sound output control unit 26A does not perform notification for the interfering object. Therefore, even though the driver has not performed an input operation, the notification device 100A is capable of preventing from unnecessarily performing notification using a notification sound for an object (non-interfering object) normally present.

The value of a confirmation counter associated with absolute coordinates stored in the non-target database 29 may be reduced, for example, with the elapse of time. Therefore, notification using the notification sound is not excessively prevented from being performed.

In addition, even though an unneeded-notification signal has been assigned to an object ID, if a change in an object corresponding to the object ID is detected by the change detection unit 24, the unneeded-notification signal may be deleted. Therefore, for example, if a parked vehicle determined to not move by the driver starts moving, the notification device 100A is capable of performing notification using a notification sound for the object.

Furthermore, an external device at a data center or the like provided outside the host vehicle V may be provided with the non-target database 29, and a functional unit for storing the absolute coordinates of an interfering object, on which notification is determined to not be needed, in the non-target database 29. Namely, the external device may store the absolute coordinates of an interfering object on which notification is determined to not be needed. Specifically, for example, the external device acquires an object ID, type information, a relative position, and a relative speed of a detected object from the object detection unit 21 via a communication cable. In addition, the external device acquires a trajectory of the host vehicle V which contains the absolute coordinates and the orientation of the host vehicle V, from the host vehicle movement determination unit 22. Furthermore, the external device acquires an object ID to which an unneeded-notification signal is assigned, from the non-target setting unit 28.

Similar to the non-target setting unit 28, based on the acquired information, the external device obtains the absolute coordinates of an interfering object which is input by the driver as an object for which no notification is needed. The external device may store the obtained absolute coordinates in a non-target database provided inside the external device. The notification device 100A may acquire the absolute coordinates and the like stored in the external device, via the communication cable, and use the absolute coordinates and the like instead of the absolute coordinates and the like stored in the non-target database 29. As described above, the absolute coordinates of an object on which notification is determined to not be needed may be provided using a network service. Therefore, information acquired by a small number of vehicles can be used by a large number of vehicles.

At that time, information transmitted from the notification device 100A to the external device may contain only the absolute coordinates of objects on which notification is determined to not be needed by drivers. In this case, it is possible to reduce the amount of communication from the notification device 100A to the external device. In addition, in order to secure the reliability of information confirmed by the drivers, the drivers or IDs of the vehicles, which have transmitted the information, may be transmitted to and stored in the external device.

Third Embodiment

Subsequently, a third embodiment will be described. In the following description, the same reference signs will be assigned to the same configuration elements as those of the notification device 100 of the first embodiment, and detailed descriptions of the same configuration elements will be omitted. Hereinbelow, mainly the difference between the first embodiment and the third embodiment will be described. An advanced autonomous driving system referred to herein may allow a driver to be partially free from the duty of monitoring outside of a vehicle. Hereinbelow, a description will be given on a notification device which assists a driver in monitoring the situation outside a vehicle using a notification sound when the driver becomes required to monitor the situation outside the vehicle from the state of being partially free from the duty of monitoring the situation outside the vehicle.

Figure 24:
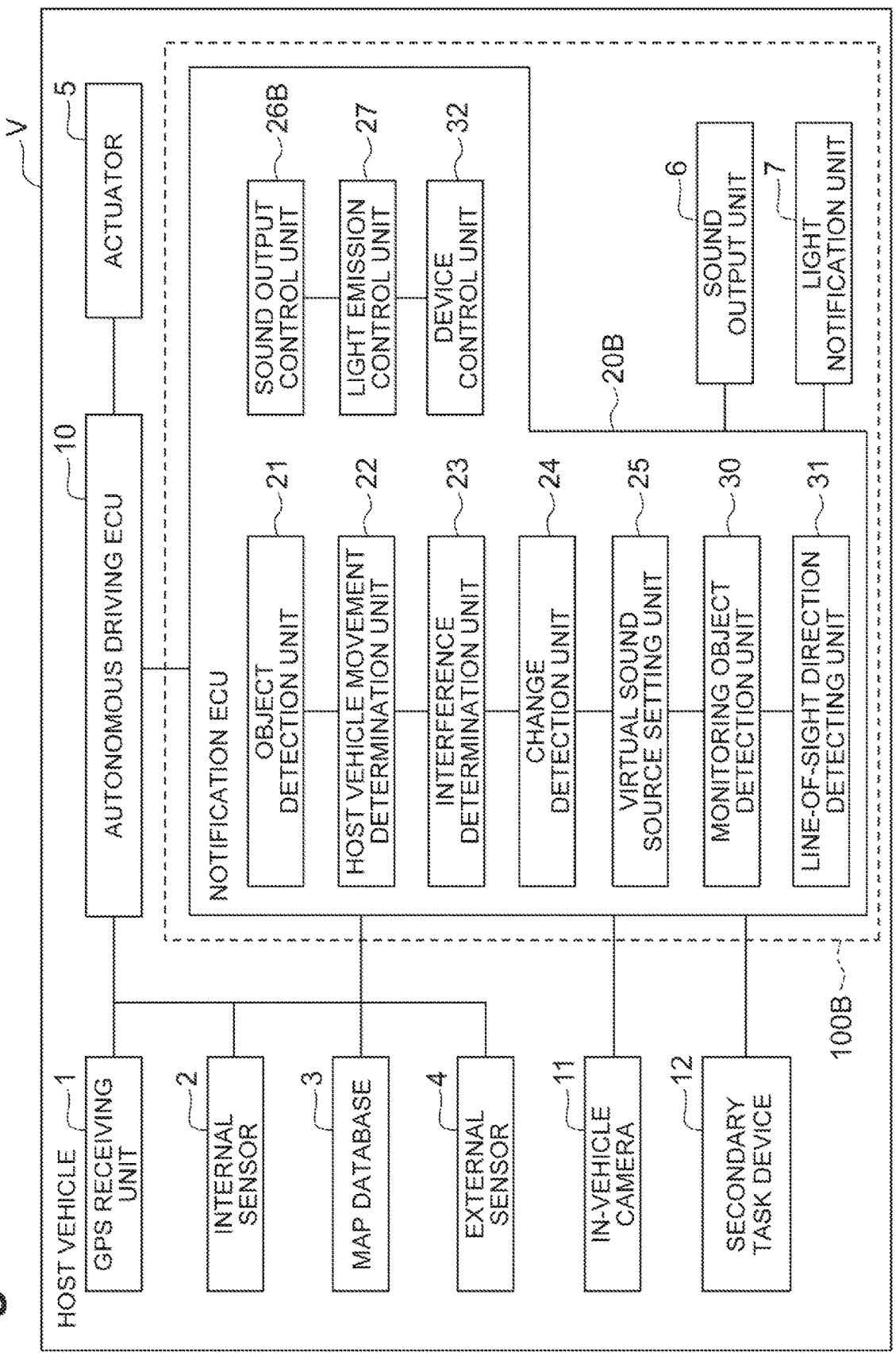
FIG. 24 is an example of functional block diagram of the vehicle including a notification device of a third embodiment.

As illustrated in FIG. 24, in order to assist the driver when required to monitor outside the vehicle, a notification device 100B of the third embodiment modifies a notification sound output to a monitoring object, in response to a deviation (the amount of deviation) between the presence direction of the monitoring object and the line of sight direction of the driver (the direction of the face). Therefore, the notification device 100B gently directs driver's attention to the monitoring object which needs to be monitored. In addition, if the host vehicle V is provided with a secondary task device 12 on which the driver performs non-driving activities (web browsing, movie watching, texting, and the like), the notification device 100B prompts the driver to turn the line of sight away from the secondary task device 12 by controlling the secondary task device 12.

Specifically, in addition to the GPS receiving unit 1 and the like of the first embodiment, an in-vehicle camera 11 and the secondary task device 12 are further provided in the host vehicle V installed with the notification device 100B. The in-vehicle camera 11 is an image capturing device that captures images of the driver of the host vehicle V. The secondary task device 12 is a device (for example, display) on which the driver performs non-driving activities such as web browsing, movie watching, and texting.

The notification device 100B includes the sound output unit 6; the light notification unit 7; and a notification ECU 20B. Similar to the notification ECU 20 of the first embodiment, the notification ECU 20B is an electronic control unit having a CPU, a ROM, a RAM, a CAN communication circuit, and the like.

The notification ECU 20B functionally includes the object detection unit 21; the host vehicle movement determination unit 22; the interference determination unit 23; the change detection unit 24; the virtual sound source setting unit 25; a monitoring object detection unit 30; a line-of-sight direction detecting unit 31; a sound output control unit 26B; the light emission control unit 27; and a device control unit 32.

The monitoring object detection unit 30 detects a monitoring object which needs to be monitored by the driver, among objects detected by the object detection unit 21. For example, based on the degree of interference determined by the interference determination unit 23, the monitoring object detection unit 30 may detect an object with the degree of interference greater than or equal to a predetermined reference value, as a monitoring object. In addition, as a monitoring object, the monitoring object detection unit 30 may detect an object with the degree of change detected by the change detection unit 24, which is greater than or equal to a predetermined reference value.

In the present embodiment, the object detected as a monitoring object by the monitoring object detection unit 30 is an object which is determined as an interfering object by the interference determination unit 23, in which a change is determined by the change detection unit 24, and for which a virtual sound source is set by the virtual sound source setting unit 25. In addition, in the present embodiment, as described in the first embodiment, the virtual sound source setting unit 25 sets a virtual sound source at the position of an interfering object in which a change is detected. Namely, the virtual sound source setting unit 25 sets a virtual sound source at the position of the monitoring object detected by the monitoring object detection unit 30.

The line-of-sight direction detecting unit 31 detects the line of sight direction of the driver or a direction to which the face of the driver points, as a driver's line of sight direction. In the present embodiment, the line-of-sight direction detecting unit 31 is capable of detecting the driver's line of sight direction using a well-known method based on images captured by the in-vehicle camera 11.

Figure 25:
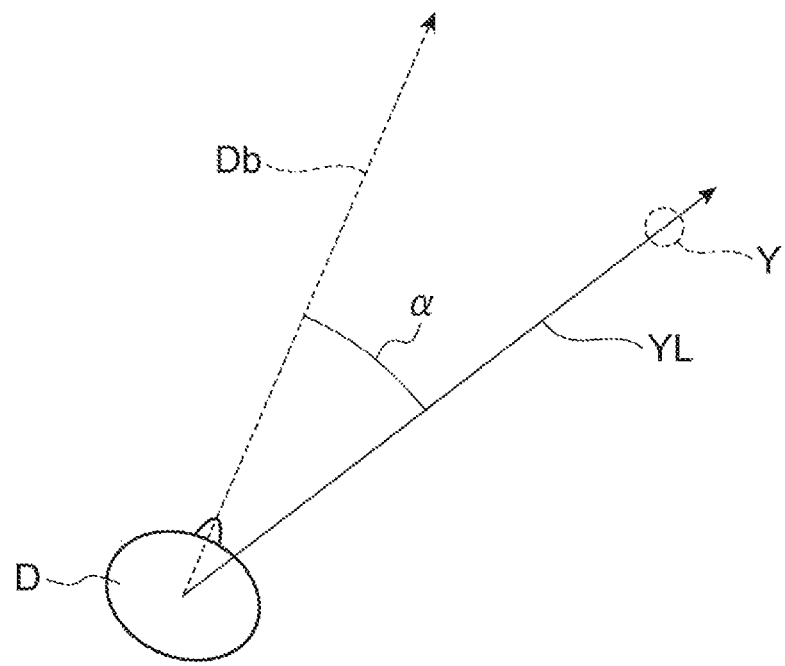
FIG. 25 is a diagram illustrating a deviation of a driver's line of sight direction with respect to a presence direction of a monitoring object.

If a monitoring object is detected by the monitoring object detection unit 30, the sound output control unit 26B outputs a notification sound for the detected monitoring object from the sound output unit 6. Herein, similar to the sound output control unit 26 of the first embodiment, the sound output control unit 26B outputs a notification sound from the sound output unit 6 such that the driver identifies that the notification sound in response to a relative condition of a monitoring object has come from the direction of a virtual sound source set for the monitoring object. Furthermore, the sound output control unit 26B modifies a notification sound for a monitoring object, as illustrated in FIG. 25, in response to a deviation a of a driver's line of sight direction Db with respect to a presence direction YL of a monitoring object Y. The presence direction YL of the monitoring object Y is a presence direction of the monitoring object Y with respect to the driver D serving as a datum point. As described above, the presence direction YL of the monitoring object Y is a direction in which a virtual sound source for the monitoring object Y is set. In addition, the driver's line of sight direction Db is detected by the line-of-sight direction detecting unit 31.

In addition, when modifying the notification sound in response to the deviation of the driver's line of sight direction, in response to the deviation, the sound output control unit 26B changes an item not used to represent the relative condition among items such as the sound volume, frequency, tempo, and tone of the notification sound. For example, if the frequency of a notification sound is used to represent a relative condition of a monitoring object, the sound output control unit 26B may change the sound volume of the notification sound in response to a deviation of a driver's line of sight direction. Hereinbelow, a description will be given on an example in which a notification sound is modified by changing a sound volume in response to a deviation of a driver's line of sight direction.

Herein, for example, the following two technical concepts can be considered to deliver the presence direction of a monitoring object to a driver by modifying a notification sound.

Figure 26:
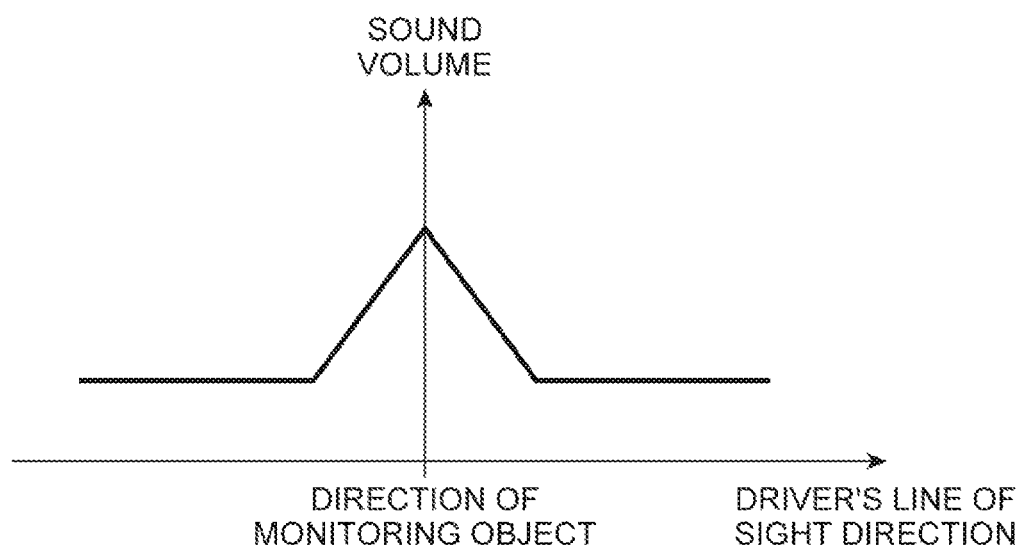
FIG. 26 is a graph illustrating a change in sound volume when a notification sound is modified based on a first technical concept.

A first technical concept is a concept in which the sound volume of a notification sound for a monitoring object is set proportional to the potential (probability) that the driver is capable of perceiving the notification sound. Namely, the technical concept is the concept of gently guiding a driver's line of sight to the sound volume increase direction of the notification sound. In this case, as illustrated in FIG. 26, for example, the sound output control unit 26B increases the sound volume of the notification sound as the driver's line of sight direction approaches the presence direction of the monitoring object. Herein, as illustrated in FIG. 26, if a deviation of the driver's line of sight direction with respect to the presence direction of the monitoring object is less than a predetermined value, the sound output control unit 26B increases the sound volume of the notification sound as the deviation decreases. In the graph illustrated in FIG. 26, the horizontal axis is the driver's line of sight direction, and the vertical axis is the sound volume of a notification sound. The same definition of the horizontal and vertical axes is applied also to FIGS. 27 and 28. In addition, in FIG. 26, when the driver's line of sight direction coincides with the presence direction of the monitoring object, the sound volume of the notification sound becomes maximum.

Figure 27:
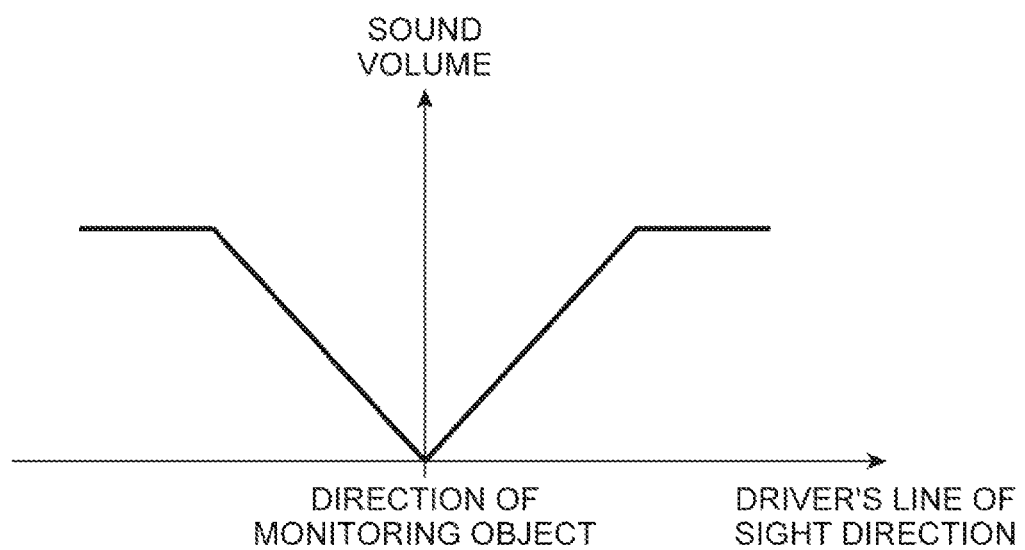
FIG. 27 is a graph illustrating a change in sound volume when a notification sound is modified based on a second technical concept.

A second technical concept is a concept in which if the deviation between the presence direction of the monitoring object and the driver's line of sight direction becomes large, since the driver is more likely to overlook the monitoring object, the sound volume of the notification sound is set proportional to an overlook probability. Namely, the technical concept is the concept of gently guiding the driver's line of sight to the sound volume decrease direction of the notification sound. In this case, as illustrated in FIG. 27, for example, the sound output control unit 26B decreases the sound volume of the notification sound as the driver's line of sight direction approaches the presence direction of the monitoring object. Herein, as illustrated in FIG. 27, if the deviation is less than a predetermined value, the sound output control unit 26B decreases the sound volume of the notification sound as the deviation decreases.

Figure 28:
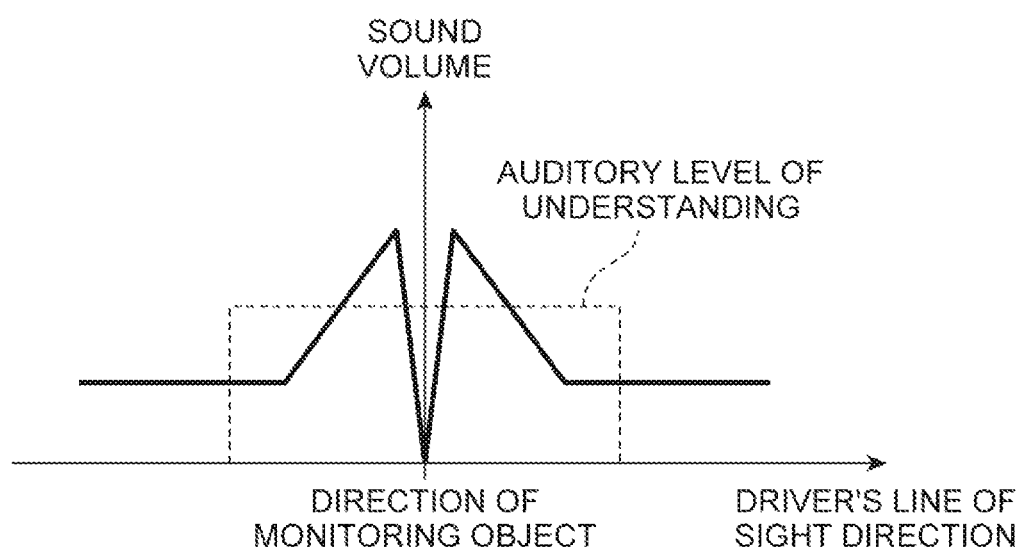
FIG. 28 is a graph illustrating a change in sound volume when a notification sound is modified based on the first technical concept and the second technical concept.

Herein, an orientation specifying accuracy using auditory sense is inferior to an orientation specifying accuracy using visual sense. In addition, the visual sense has two accuracies, namely, high-resolution perception by the fovea centralis and low-resolution perception by peripheral vision. For this reason, as illustrated in FIG. 28, the sound output control unit 26B may modify the volume of a notification sound using the first technical concept if the deviation between the presence direction of the monitoring object and the driver's line of sight direction is large, and may modify the sound volume of a notification sound using the second technical concept if the deviation is small. In this case, when the driver points to the presence direction of the monitoring object (the direction of a virtual sound source), the volume of the notification sound increases as the driver's line of sight direction approaches the presence direction of the monitoring object, and when the driver's line of sight direction coincides with the presence direction of the monitoring object, the notification sound has decreased (for example, sound volume is zero).

If a monitoring object is detected by the monitoring object detection unit 30, the device control unit 32 prompts the driver to turn the line of sight away from the secondary task device 12 by controlling the secondary task device 12. The device control unit 32 may prompt the driver to turn the line of sight away from the secondary task device 12, for example, by switching the display of the secondary task device 12 from a display for a non-driving activity such as web browsing to a display indicative of the degree of interference with the monitoring object.

As described above, the notification device 100B is capable of notifying the driver that the line of sight direction (driver's line of sight direction) has deviated, by outputting a notification sound in response to the deviation between the presence direction of the monitoring object (the direction of the virtual sound source) and the driver's line of sight direction. The notification device 100B is capable of prompting the driver to turn the driver's line of sight direction to the presence direction of the monitoring object (the direction of the virtual sound source), using the notification sound modified in response to the deviation.

In the present embodiment, the virtual sound source setting unit 25 sets a virtual sound source at the position of an interfering object in which a change is detected, but is not limited to having the configuration. As described in various specific examples of notification in the first embodiment, the virtual sound source setting unit 25 may set a virtual sound source, for example, at a merge location. In this case, the notification device 100B is capable of guiding the driver's line of sight to the merge location or the like.

The embodiments of the present disclosure have been described above; however, the present disclosure is not limited to the embodiments. For example, in the embodiments, a notification target object is an object which is determined as an interfering object by the interference determination units 23 and 23A. The present disclosure is not limited to the configuration. The notification target object may be an object in which a change is detected by the change detection unit 24. Namely, in the embodiments, the change detection unit 24 detects whether or not there is a change in the object detected by the object detection unit 21 instead of in the interfering object determined by the interference determination unit 23. If there is a changing object, notification may be performed for the changing object before determining whether or not the changing object interferes with the host vehicle V.

In addition, for example, in the embodiments, the notification target object is an object in which a change is detected by the change detection unit 24. The present disclosure is not limited to the configuration, and the notification target object may be an object that is determined to interfere with the host vehicle V by the interference determination unit 23. Namely, in the embodiments, the change detection unit 24 may not be provided.

In addition, for example, in the embodiments, the interference determination units 23 and 23A may not be provided. Namely, the notification target object may be an object detected by the object detection unit 21.

In the embodiments, the notification devices 100, 100A, and 100B are not limited to being installed in a vehicle capable of autonomous driving. For example, the notification device 100 and the like may be installed in a vehicle capable of assisting driving or a manual driving vehicle. In this case, the host vehicle movement determination unit 22 of the notification device 100 and the like may calculate a trajectory of the vehicle using various well-known methods using a steering angle, a vehicle speed, and the like.

In addition, in the embodiments, in addition to notification using a notification sound, notification using light is not necessarily performed. Namely, the light emission control unit 27 and the light notification unit 7 may not be provided.

What is claimed is:

1. A notification device that notifies a driver of a host vehicle about information of an object around the host vehicle, the notification device comprising an electronic control unit configured to:
   detect a position of the object and a relative condition of the object with respect to the host vehicle, based on a detection result of an external sensor;
   set a virtual sound source around the driver, based on the detected position of the object;
   output a notification sound to the driver;
   output the notification sound such that the driver identifies that the notification sound in response to the relative condition has come from a direction of the set virtual sound source, based on the set virtual sound source and the relative condition;
   detect a line of sight direction of the driver or a direction to which a face of the driver points, as a driver's line of sight direction; and
   output the notification sound in response to a deviation between a direction of the virtual sound source with respect to the driver and the driver's line of sight direction.

2. The notification device according to claim 1, wherein the electronic control unit is further configured to:
   notify the driver using light; and
   emit light in response to the relative condition.

3. The notification device according to claim 1, wherein the electronic control unit is further configured to move the virtual sound source based on at least one of the detected position of the object and a position of the object which is predicted based on the detected position of the object.

4. The notification device according to claim 1, wherein the electronic control unit is further configured to:
   determine whether or not the detected object has a potential for interfering with the host vehicle;
   output the notification sound for the object that is determined to have the potential for interfering with the host vehicle; and
   not output the notification sound for the object that is determined to have no potential for interfering with the host vehicle.

5. The notification device according to claim 1, wherein the electronic control unit is further configured to:
   set the object for which notification using the notification sound is not performed, based on an input operation performed by the driver; and
   not output the notification sound for the object set as the object for which notification using the notification sound is not performed.

* * * * *